(12) United States Patent
Blum et al.

(10) Patent No.: US 10,684,494 B2
(45) Date of Patent: Jun. 16, 2020

(54) FABRICATION OF SEE-THROUGH NEAR EYE OPTICAL MODULE AND OPHTHALMIC LENS

(71) Applicant: NewSight Reality, Inc., Roanoke, VA (US)

(72) Inventors: Ronald Blum, Roanoke, VA (US); Philip Nathan Garfinkle, Jacksonville Beach, FL (US)

(73) Assignee: NewSight Reality, Inc., Roanoke, VA (US)

( * ) Notice: Subject to any disclaimer, the term of this patent is extended or adjusted under 35 U.S.C. 154(b) by 0 days.

(21) Appl. No.: 16/600,056

(22) Filed: Oct. 11, 2019

(65) Prior Publication Data

US 2020/0096790 A1 Mar. 26, 2020

Related U.S. Application Data

(63) Continuation-in-part of application No. 16/449,395, filed on Jun. 22, 2019, which is a continuation-in-part
(Continued)

(51) Int. Cl.
*G09G 5/00* (2006.01)
*G02C 7/06* (2006.01)
(Continued)

(52) U.S. Cl.
CPC ............ *G02C 7/06* (2013.01); *G06T 19/006* (2013.01); *G02B 2027/014* (2013.01); *G02B 2027/0178* (2013.01)

(58) Field of Classification Search
CPC .. G02C 7/06; G06T 19/006; G02B 2027/014; G02B 2027/0178
See application file for complete search history.

(56) References Cited

U.S. PATENT DOCUMENTS

2013/0222235 A1 8/2013 Abdollahi et al.
2014/0118829 A1 5/2014 Ma et al.
(Continued)

FOREIGN PATENT DOCUMENTS

WO 01/06298 A1 1/2001

OTHER PUBLICATIONS

PCT Search Report and Written Opinion in PCT/US2019/055735 (10 pages), dated Feb. 6, 2020.

*Primary Examiner* — Charles Tseng
(74) *Attorney, Agent, or Firm* — Woods Rogers PLC; Nathan A. Evans

(57) ABSTRACT

The present invention is directed to a see-through near eye optical module that in most cases is fabricated as a stand-alone unit. The see-through near eye optical module is in certain embodiments then placed in optical communication and alignment with an eyewear lens having appropriate optical power such that when a wearer thereof looks through the see-through near eye optical module he or she can see a real world image and virtual image clearly. In other embodiments the appropriate optical power is provided in the rear section of the see-through near eye optical module. Thus, the combination of both the see-through near eye optical module and the appropriate optical power provides the wearer with a clear augmented reality or mixed reality experience. The placement can be by way of positioning within an open notch, hole, groove, recess, or other section of an eyewear lens.

29 Claims, 35 Drawing Sheets

Related U.S. Application Data of application No. 16/289,623, filed on Feb. 28, 2019, which is a continuation-in-part of application No. 16/008,707, filed on Jun. 14, 2018, now Pat. No. 10,466,487, which is a continuation-in-part of application No. 15/994,595, filed on May 31, 2018.

(60) Provisional application No. 62/530,638, filed on Jul. 10, 2017, provisional application No. 62/648,371, filed on Mar. 26, 2018, provisional application No. 62/638,789, filed on Mar. 5, 2018, provisional application No. 62/626,660, filed on Feb. 5, 2018, provisional application No. 62/624,201, filed on Jan. 31, 2018, provisional application No. 62/619,752, filed on Jan. 20, 2018, provisional application No. 62/613,313, filed on Jan. 3, 2018, provisional application No. 62/607,582, filed on Dec. 19, 2017, provisional application No. 62/546,473, filed on Aug. 16, 2017, provisional application No. 62/542,168, filed on Aug. 7, 2017, provisional application No. 62/522,866, filed on Jun. 21, 2017, provisional application No. 62/513,828, filed on Jun. 1, 2017, provisional application No. 62/694,222, filed on Jul. 5, 2018, provisional application No. 62/700,621, filed on Jul. 19, 2018, provisional application No. 62/700,632, filed on Jul. 19, 2018, provisional application No. 62/703,909, filed on Jul. 27, 2018, provisional application No. 62/703,911, filed on Jul. 27, 2018, provisional application No. 62/711,669, filed on Jul. 30, 2018, provisional application No. 62/717,424, filed on Aug. 10, 2018, provisional application No. 62/720,113, filed on Aug. 20, 2018, provisional application No. 62/720,116, filed on Aug. 21, 2018, provisional application No. 62/728,251, filed on Sep. 7, 2018, provisional application No. 62/732,039, filed on Sep. 17, 2018, provisional application No. 62/732,138, filed on Sep. 17, 2018, provisional application No. 62/739,904, filed on Oct. 2, 2018, provisional application No. 62/739,907, filed on Oct. 2, 2018, provisional application No. 62/752,739, filed on Oct. 30, 2018, provisional application No. 62/753,583, filed on Oct. 31, 2018, provisional application No. 62/754,929, filed on Nov. 2, 2018, provisional application No. 62/755,626, filed on Nov. 5, 2018, provisional application No. 62/755,630, filed on Nov. 5, 2018, provisional application No. 62/756,528, filed on Nov. 6, 2018, provisional application No. 62/756,542, filed on Nov. 6, 2018, provisional application No. 62/769,883, filed on Nov. 20, 2018, provisional application No. 62/770,210, filed on Nov. 21, 2018, provisional application No. 62/771,204, filed on Nov. 26, 2018, provisional application No. 62/774,362, filed on Dec. 3, 2018, provisional application No. 62/775,945, filed on Dec. 6, 2018, provisional application No. 62/778,960, filed on Dec. 13, 2018, provisional application No. 62/778,972, filed on Dec. 13, 2018, provisional application No. 62/780,391, filed on Dec. 17, 2018, provisional application No. 62/780,396, filed on Dec. 17, 2018, provisional application No. 62/783,596, filed on Dec. 21, 2018, provisional application No. 62/783,603, filed on Dec. 21, 2018, provisional application No. 62/785,284, filed on Dec. 27, 2018, provisional application No. 62/787,834, filed on Jan. 3, 2019, provisional application No. 62/788,275, filed on Jan. 4, 2019, provisional application No. 62/788,993, filed on Jan. 7, 2019, provisional application No. 62/788,995, filed on Jan. 7, 2019, provisional application No. 62/790,514, filed on Jan. 10, 2019, provisional application No. 62/790,516, filed on Jan. 10, 2019, provisional application No. 62/793,166, filed on Jan. 16, 2019, provisional application No. 62/794,779, filed on Jan. 21, 2019, provisional application No. 62/796,388, filed on Jan. 24, 2019, provisional application No. 62/796,410, filed on Jan. 24, 2019, provisional application No. 62/830,645, filed on Apr. 8, 2019, provisional application No. 62/847,427, filed on May 14, 2019, provisional application No. 62/848,636, filed on May 16, 2019.

(51) Int. Cl.
*G06T 19/00* (2011.01)
*G02B 27/01* (2006.01)

(56) References Cited

U.S. PATENT DOCUMENTS

| | | |
|---|---|---|
| 2015/0097756 A1 | 4/2015 | Ziarati et al. |
| 2016/0018645 A1* | 1/2016 | Haddick ............ G02B 27/0172 345/8 |
| 2016/0238850 A1 | 8/2016 | Yang |
| 2017/0031179 A1 | 2/2017 | Guillot et al. |
| 2018/0196265 A1* | 7/2018 | Bouchier ........... G02B 27/0172 |

* cited by examiner

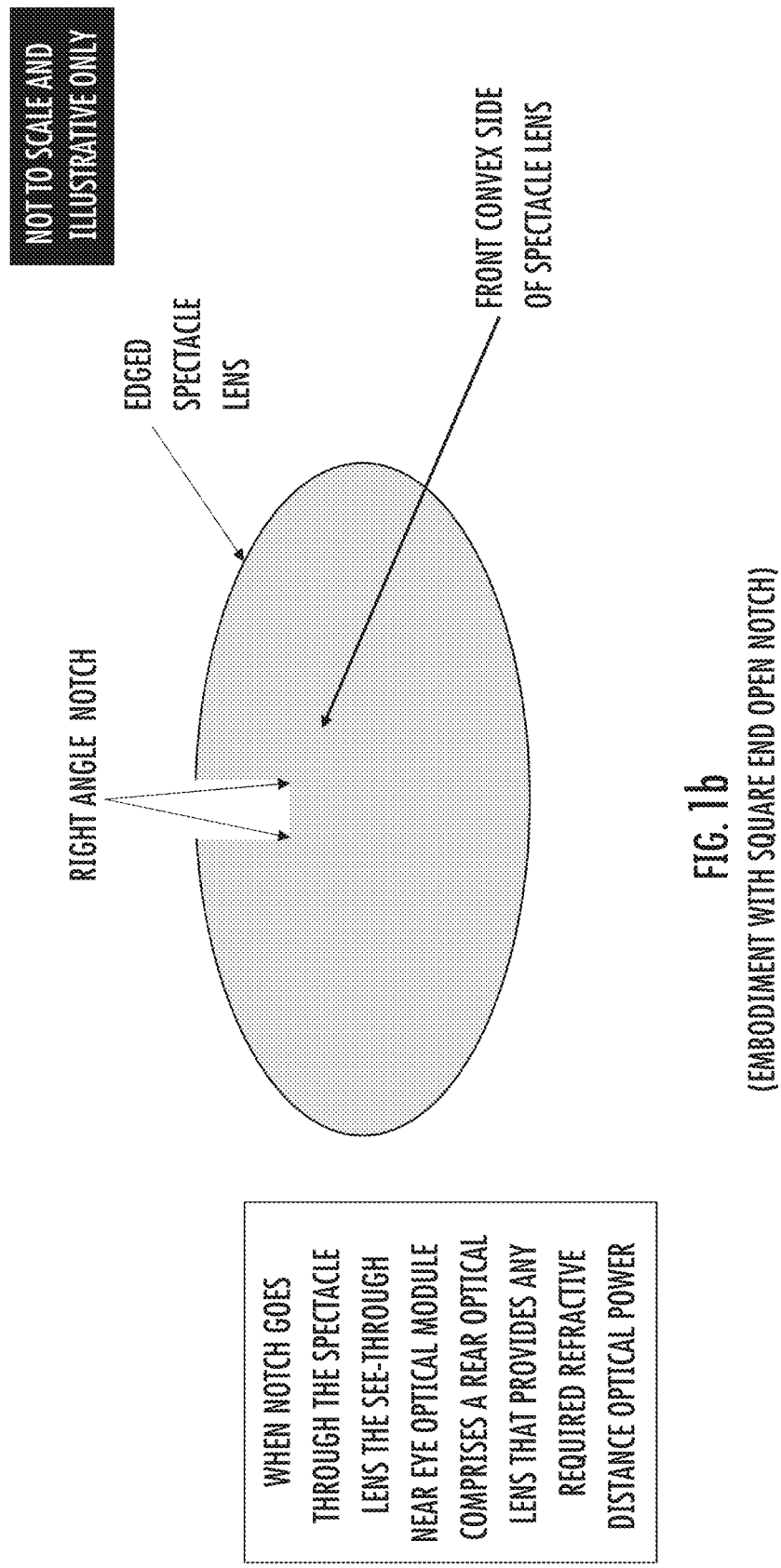

(EMBODIMENT WITH ROUNDED END OPEN NOTCH)

(SEE-THROUGH NEAR EYE OPTICAL MODULE AND ELECTRICAL CONNECTOR MOUNTED IN OPEN NOTCH)

(SEE-THROUGH NEAR EYE OPTICAL MODULE AND ELECTRICAL CONNECTOR MOUNTED IN OPEN NOTCH)

(SEE-THROUGH NEAR EYE OPTICAL MODULE AND ELECTRICAL CONNECTOR MOUNTED IN HOLE)

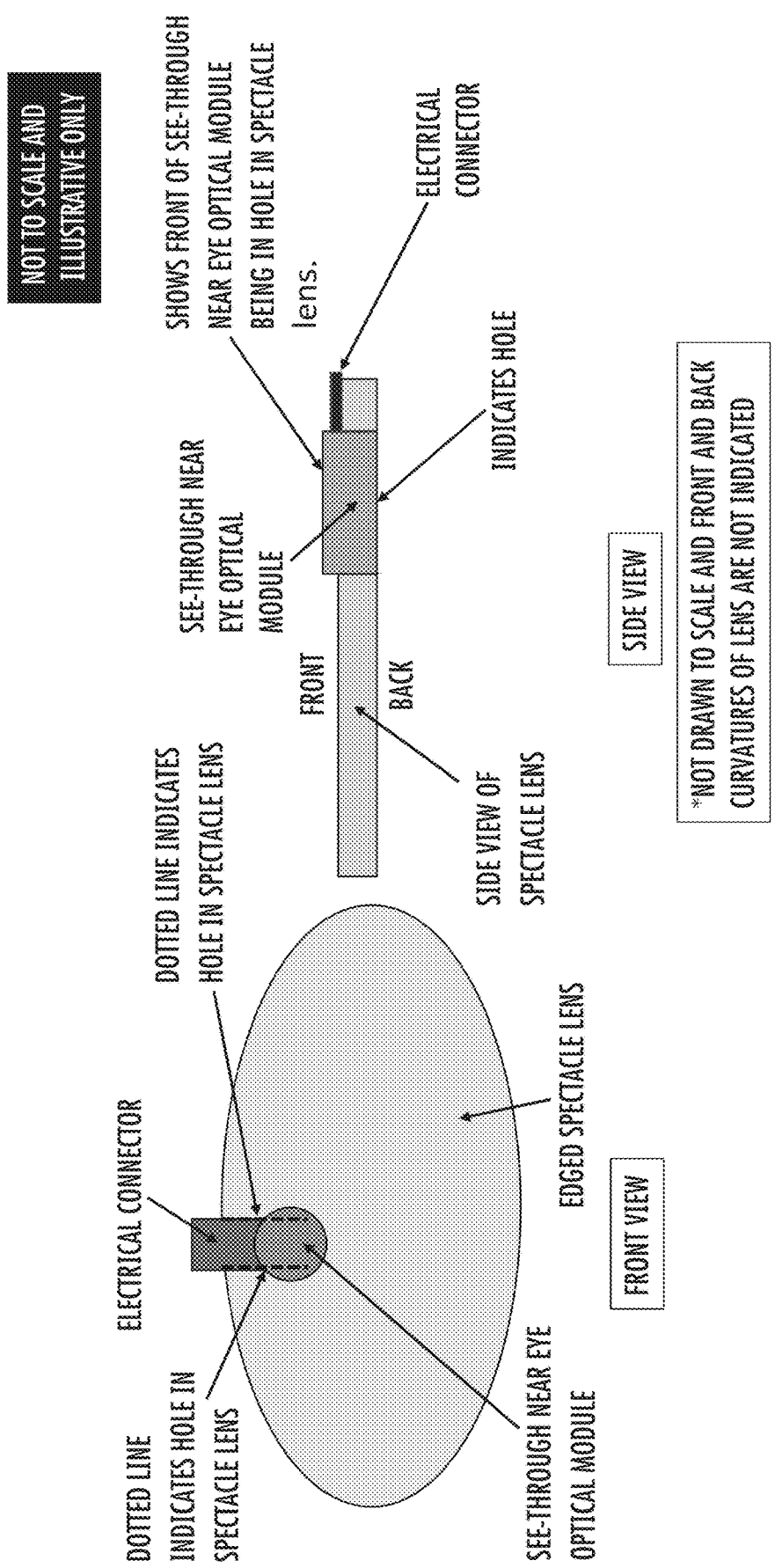

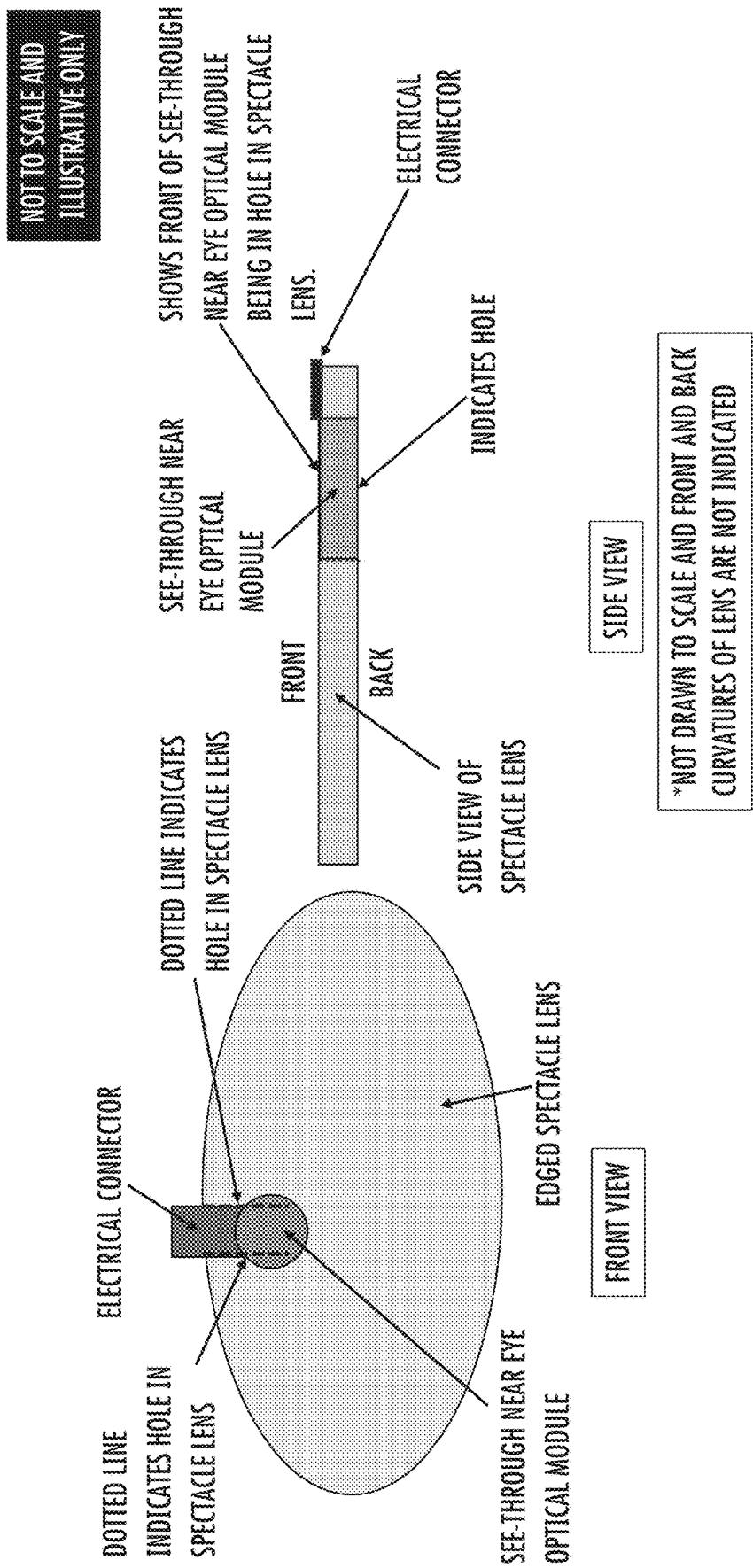

(SEE-THROUGH NEAR EYE OPTICAL MODULE LOCATED WITHIN HOLE IN THE SPECTACLE LENS)

(SQUARE END GROOVE IN FRONT SURFACE)

(ROUNDED END GROOVE)

(SEE-THROUGH NEAR EYE OPTICAL MODULE AND ELECTRICAL CONNECTOR MOUNTED IN GROOVE)

(SEE-THROUGH NEAR EYE OPTICAL MODULE AND ELECTRICAL CONNECTOR MOUNTED IN GROOVE)

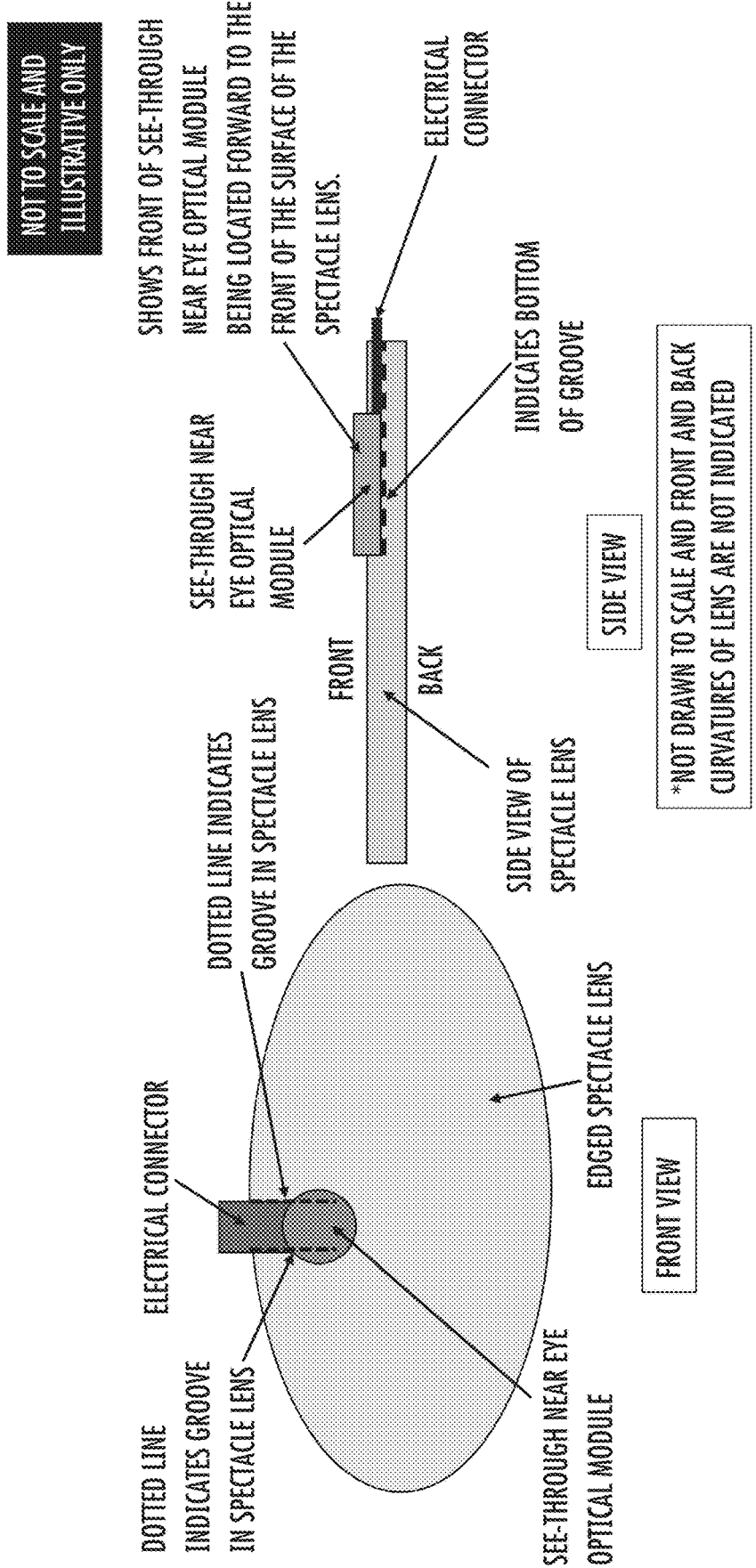

(FRONT OF SEE-THROUGH NEAR EYE OPTICAL MODULE OF LOCATED FORWARD TO THE FRONT SURFACE OF THE SPECTACLE LENS)

(SECTIONED EYEWEAR FRAME FRONT)

(SECTIONED EYEWEAR FRAME FRONT)

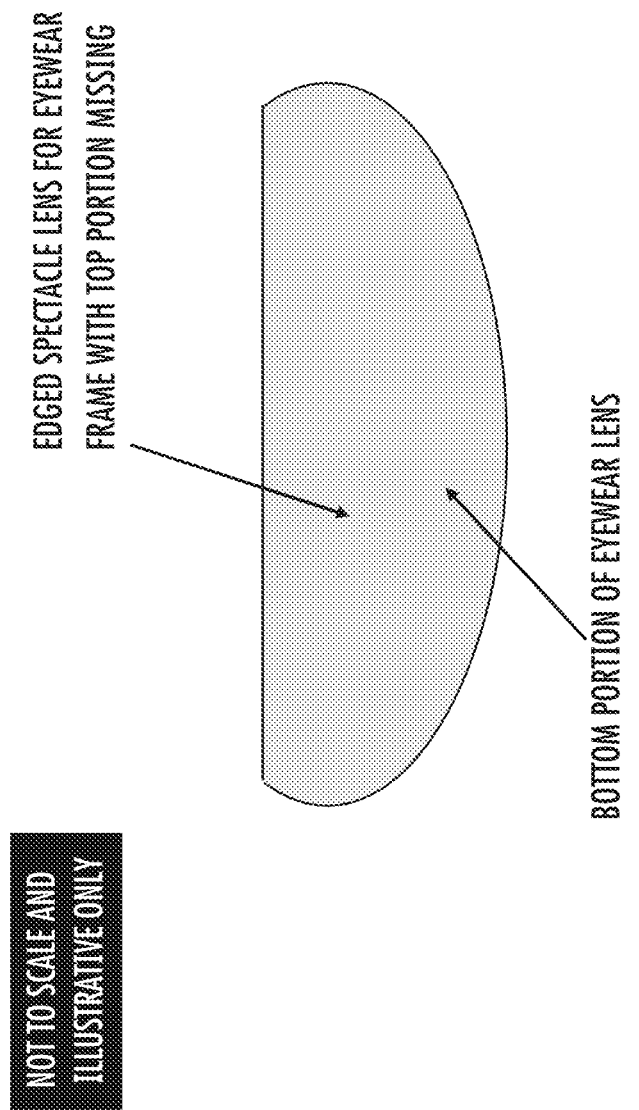

(SIDE VIEW OF FIRST EMBODIMENT OF FIG. 4C)

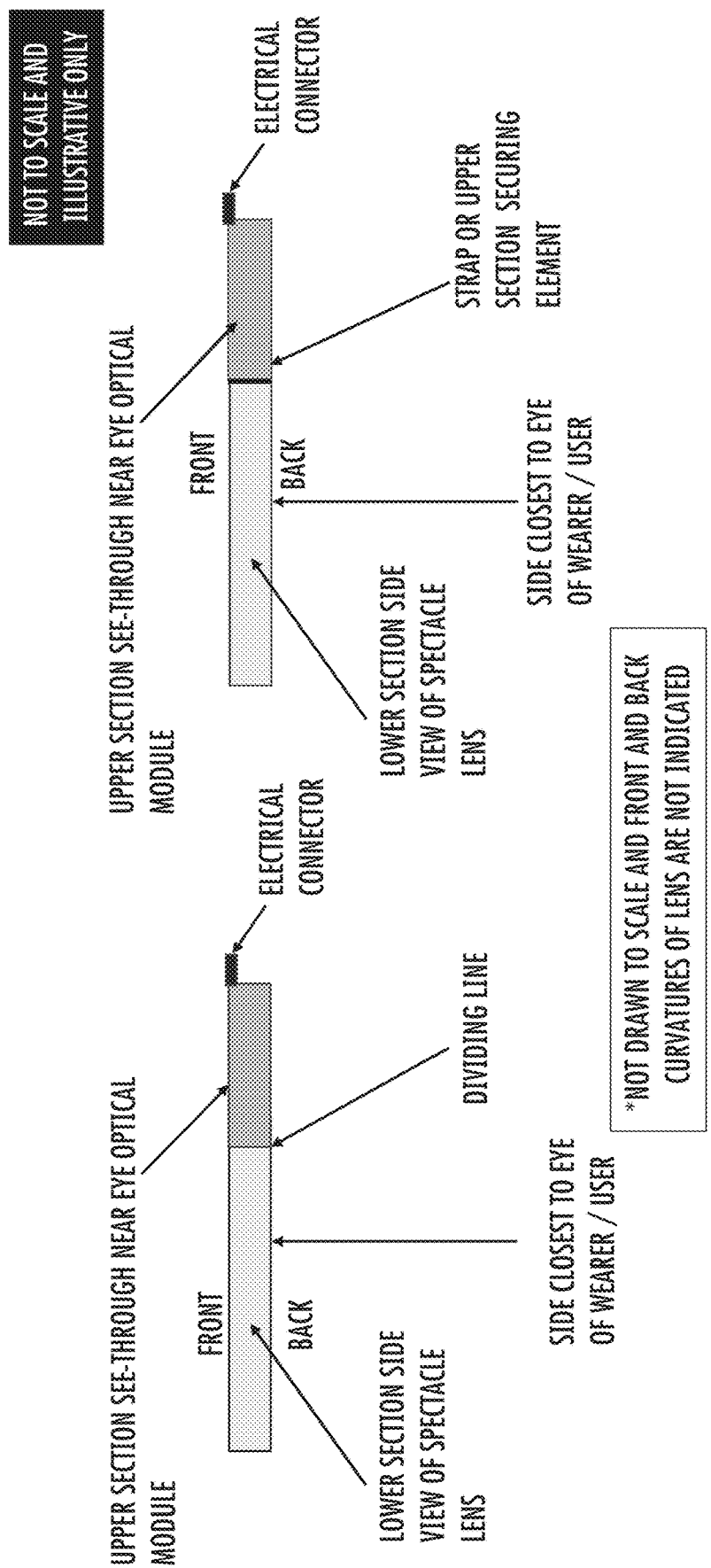

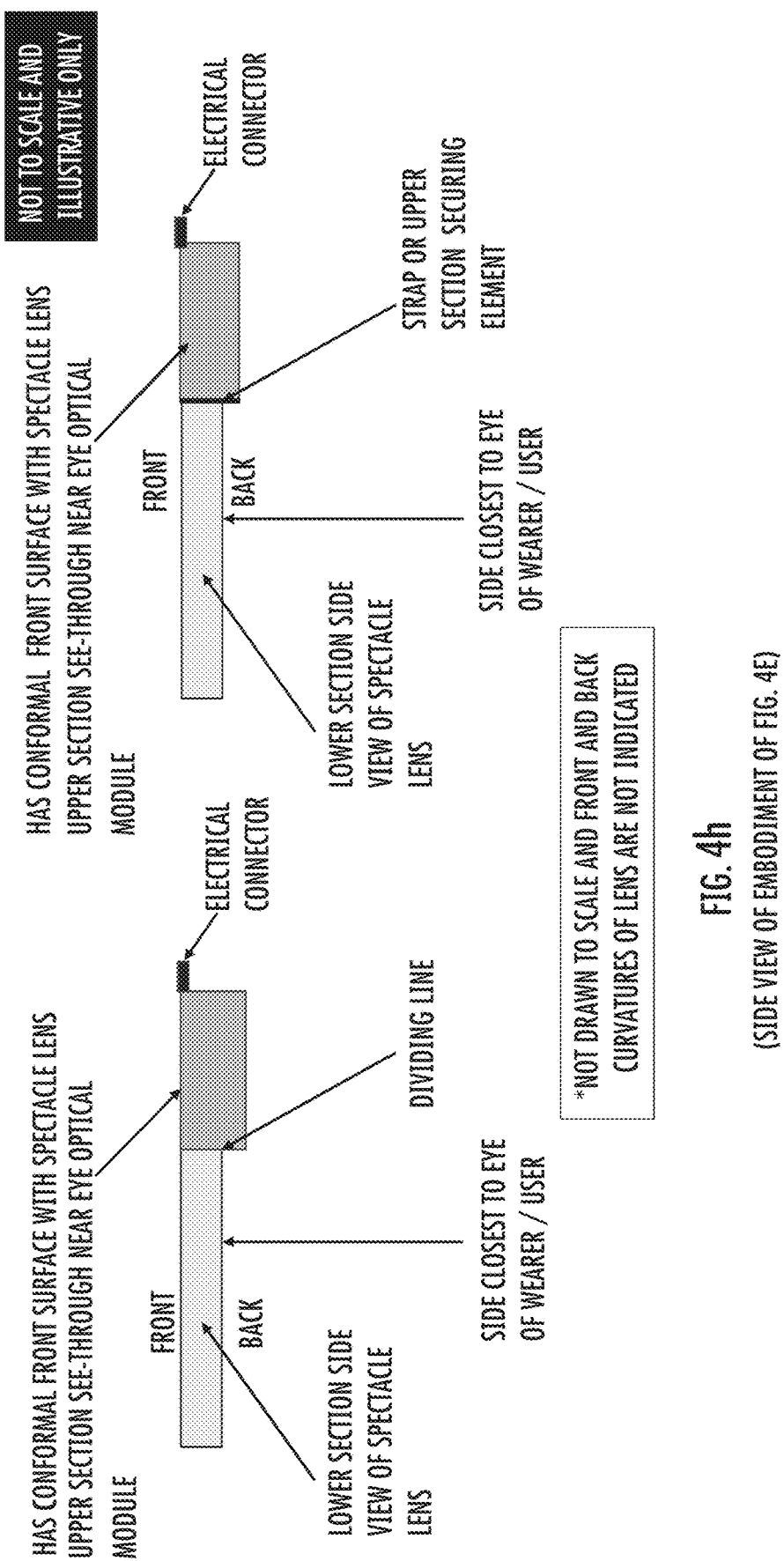

(SIDE VIEW OF SEE-THROUGH NEAR EYE OPTICAL MODULE WITHIN A SECTION OF EYEWEAR LENS)

(CAST SEE-THROUGH NEAR EYE OPTICAL MODULE EMBEDDED WITHIN EYEWEAR LENS FRONT)

(Cast See-Through Near Eye Optical Module Embedded within Eyewear Lens Front)

(Cast See-Through Near Eye Optical Module Embedded within Eyewear Lens Front)

(Cast See-Through Near Eye Optical Module Embedded within Eyewear Lens Front)

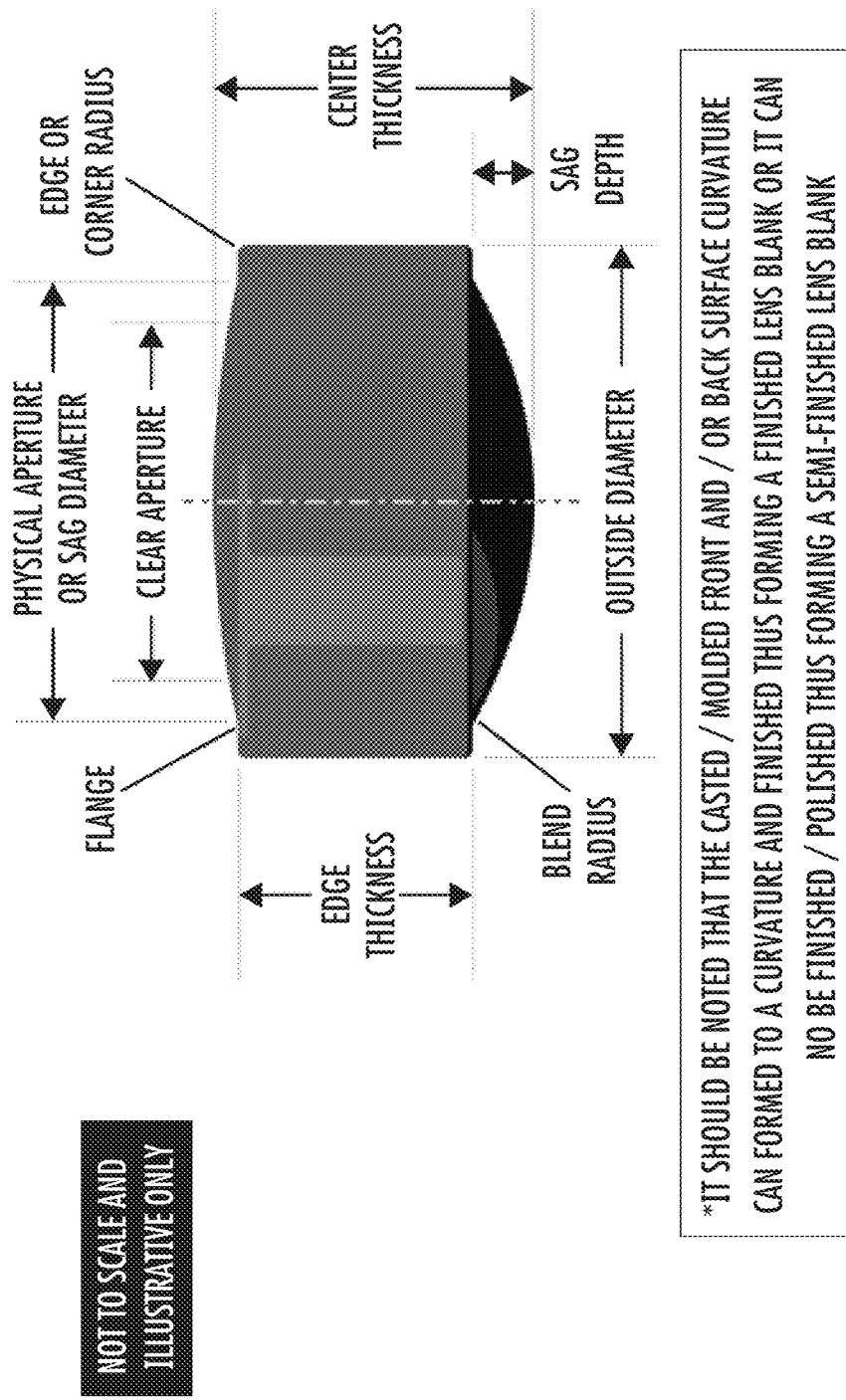

FABRICATION OF SEE-THROUGH NEAR EYE OPTICAL MODULE AND OPHTHALMIC LENS

CROSS REFERENCE TO RELATED APPLICATIONS

The present application is a continuation-in-part and relies on the disclosures of and claims priority to and the benefit of the filing date of U.S. patent application Ser. No. 16/449,395 filed Jun. 22, 2019, which claims priority to U.S. patent application Ser. No. 16/289,623 filed Feb. 28, 2019, which claims priority to U.S. patent application Ser. No. 16/008,707 filed Jun. 14, 2018, which claims priority to U.S. application Ser. No. 15/994,595 filed May 31, 2018, as well as the following U.S. Provisional Patent Applications, with filing dates and titles, the disclosures of which are hereby incorporated by reference herein in their entireties.
62/694,222 filed on Jul. 5, 2018: Optimizing Micro-Lens Array for use with TOLED for Augmented Reality or Mixed Reality
62/700,621 filed on Jul. 19, 2018: LC Switchable See-Through TOLED Optical Combiner for Augmented Reality or Mixed Reality
62/700,632 filed on Jul. 19, 2018: Improved See-Through TOLED Optical Combiner for Augmented Reality or Mixed Reality
62/703,909 filed on Jul. 27, 2018: Near Eye See-Through Display Optical Combiner for Augmented Reality or Mixed Reality
62/703,911 filed on Jul. 27, 2018: LC Switchable Near Eye See-Through Display Combiner for Augmented Reality or Mixed Reality
62/711,669 filed on Jul. 30, 2018: Near Eye See-Through Display Optical Combiner Comprising LC Switchable Lensing System for Augmented Reality or Mixed Reality
62/717,424 filed on Aug. 10, 2018: Near Eye See-Through Display Optical Combiner for Augmented Reality or Mixed Reality and HMD
62/720,113 filed on Aug. 20, 2018: Sparsely Populated Near Eye Display Optical Combiner and Static Micro-Optic Array for AR and MR
62/720,116 filed on Aug. 21, 2018: Sparsely Populated Near Eye Display Optical Combiner for AR and MR
62/728,251 filed on Sep. 7, 2018: Figures For Eyewear Comprising a See-Through Eye Display Optical Combiner
62/732,039 filed on Sep. 17, 2018: Eyewear Comprising a Dynamic See-Through Near Eye Display Optical Combiner
62/732,138 filed on Sep. 17, 2018: Binocular See-Through Near Eye Display Optical Combiner
62/739,904 filed on Oct. 2, 2018: See-Through Near Eye Display Optical Combiner Module and Attachment Mean
62/739,907 filed on Oct. 2, 2018: Dynamic See-Through Near Eye Display Optical Combiner Module and Attachment Mean
62/752,739 filed on Oct. 30, 2018: Photonic Optical Combiner Module
62/753,583 filed on Oct. 31, 2018: Improved Photonic Optical Combiner Module
62/754,929 filed on Nov. 2, 2018: Further Improved Photonic Optical Combiner Module
62/755,626 filed on Nov. 5, 2018: Near Eye Display See Through Optical Combiner
62/755,630 filed on Nov. 5, 2018: Static See Through Near Eye Display Optical Combiner
62/756,528 filed on Nov. 6, 2018: Detachable Attachable Two Section Frame Front for XR
62/756,542 filed on Nov. 6, 2018: Spectacle Lens in Optical Communication with See-Through Near Eye Display Optical Combiner
62/769,883 filed on Nov. 20, 2018: Enhanced Near Eye Display Optical Combiner Module
62/770,210 filed on Nov. 21, 2018: Further Enhanced Near Eye Display Optical Combiner Module
62/771,204 filed on Nov. 26, 2018: Adjustable Virtual Image Near Eye Display Optical Combiner Module
62/774,362 filed on Dec. 3, 2018: Integrated Lens with NSR Optical Combiner
62/775,945 filed on Dec. 6, 2018: See-Through Near Eye Display Optical Combiner Module With Front Light Blocker
62/778,960 filed on Dec. 13, 2018: See-Through Near Eye Display Having Opaque Pixel Patches
62/778,972 filed on Dec. 13, 2018: Improved See-Through Near Eye Display Optical Combiner Module With Front Light Blocker
62/780,391 filed on Dec. 17, 2018: See-Through Modulated Near Eye Display With Light Emission Away From The Eye of a Wearer Reduced or Blocked
62/780,396 filed on Dec. 17, 2018: Modulated MLA and/or Near Eye Display Having Light Emission Away From The Eye of a Wearer Reduced or Blocked
62/783,596 filed on Dec. 21, 2018: Modulated MLA and/or Near Eye Display With Light Emission Away From Eye of User
62/783,603 filed on Dec. 21, 2018: Improved Modulated MLA and/or Near Eye Display With Light Emission Away From Eye of User
62/785,284 filed on Dec. 27, 2018: Advanced See-Through Modulated Near Eye Display With Outward Light Emission Reduced or Blocked
62/787,834 filed on Jan. 3, 2018: Advanced Integrated Lens with NSR Optical Combiner
62/788,275 filed on Jan. 4, 2019: Advanced See-Through Near Eye Display Optical Combiner
62/788,993 filed on Jan. 7, 2019: Fabricating an Integrated Lens with See-Through Near Eye Display Optical Combiner
62/788,995 filed on Jan. 7, 2019: Further Advanced See-Through Near Eye Display Optical Combiner
62/790,514 filed on Jan. 10, 2019: Further, Further Advanced See-Through Near Eye Display Optical Combiner
62/790,516 filed on Jan. 10, 2019: Advanced, Advanced See-Through Near Eye Display Optical Combiner
62/793,166 filed on Jan. 16, 2019: Near Eye Display See-Through Module for XR
62/794,779 filed on Jan. 21, 2019: Near Eye Module Invention Summary
62/796,388 filed on Jan. 24, 2019: Transparent Near Eye Display Invention Summary
62/796,410 filed on Jan. 24, 2019: Transparent Near Eye Module Summary
62/830,645 filed on Apr. 8, 2019: Enhancement of Virtual Image
62/847,427 filed May 14, 2019: Enhancing the AR Image
62/848,636 filed May 16, 2019: Further Enhanced AR Image
The present application also relies on the disclosures of and claims priority to and the benefit of the filing dates of U.S. Patent Application Nos 62/756,528 filed Nov. 6, 2018, 62/756,542 filed Nov. 6, 2018, 62/788,993 filed Jan. 7, 2019, and international application no. PCT/US2019/055735 filed Oct. 10, 2019. The present application is further related to U.S. Application Nos. 62/717,424 filed Aug. 10, 2018, 62/720,113 filed Aug. 20, 2018, 62/728,251 filed Sep. 7, 2018, and 62/732,138 filed Sep. 17, 2018. The disclosures of each of these applications is incorporated by reference herein in their entirety.

BACKGROUND

Field of the Invention

The present invention is directed to a see-through near eye optical module that in most cases is fabricated as a stand-alone unit. The see-through near eye optical module is in certain embodiments then placed in optical communication and alignment with an eyewear lens having appropriate optical power such that when a wearer thereof looks through the see-through near eye optical module he or she can see a real world image and virtual image clearly. In other embodiments the appropriate optical power is provided in the rear section of the see-through near eye optical module. Thus, the combination of both the see-through near eye optical module and the appropriate optical power provides the wearer with a clear augmented reality or mixed reality experience. The placement can be by way of positioning within an open notch, hole, groove, recess, and/or section of an eyewear lens.

Description of Related Art

Today's augmented and/or mixed reality systems in most cases have a large form factor and are clunky, heavy, power hungry and expensive. For these systems to have an increased level of adoption a major transformational technology change or innovation is needed. In addition, it is important that any such innovation can be easily adapted to current established eyewear and ophthalmic lens manufacturing and distribution. The innovation disclosed herein teaches such a transformational breakthrough for the AR (augmented reality) & MR (mixed reality) industries.

SUMMARY OF THE INVENTION

Provided in embodiments of the present invention are various methods of combining optically a see-through near eye optical module with the appropriate optical power lens or lens system such that the wearer thereof can see a real world image and virtual image clearly while experiencing augmented reality or mixed reality. The augmented reality or mixed reality system can, in aspects, provide an ophthalmic lens in optical communication with a see-through near eye optical module, wherein the see-through near eye optical module comprises a see-through near eye display and a see-through near eye micro-lens array, wherein the optical power measured through the see-through near eye optical module and the eyewear lens section which is located directly behind the see-through near eye optical module is within 20% of the same optical power as if it was measured through the ophthalmic lens prior to any modification of the ophthalmic lens for attaching the see-through near eye optical module. The augmented reality or mixed reality system may comprise an ophthalmic lens in optical communication with a see-through near eye optical module, wherein the see-through near eye optical module comprises a see-through near eye display and a see-through near eye micro-lens array, wherein the overall optical power measured through the see-through near eye optical module and the ophthalmic lens section which is located directly behind the see-through near eye optical module is within 10% of the same optical power as the distance portion of the ophthalmic lens. The augmented reality or mixed reality system may comprise an ophthalmic lens in optical communication with a see-through near eye optical module, wherein the see-through near eye optical module comprises a see-through near eye display and a micro-lens array, wherein a portion of the back side of see-through near eye optical module is in front of a portion of the ophthalmic lens, wherein a floor or bottom portion of the ophthalmic lens that is closest to the back side of see-through near eye optical module is curved or shaped within 20% of the front surface base curve of the ophthalmic lens to which the see-through near eye optical module has been positioned or has replaced, and wherein the backside size of the see-through near eye optical module is smaller in surface area compared to the surface area of the back side surface area of the ophthalmic lens.

Such a see-through near eye display can be an electronic display that permits seeing through and/or in between the pixels of such a display. When seeing through the pixels the pixels are either semi-transparent or transparent. When seeing between the pixels the pixels can be either opaque, semi-transparent or transparent. By way of example only, one or more of the following pixel light sources or light emitters can be utilized with or as the see-through near eye display: OLED, micro-LED or micro-iLED, Flexible micro-iLED or Flexible micro-LED, TOLED (transparent organic light emitting diode), PHOLED (Phosphorescent OLED), FOLED (Flexible OLED), WOLED (white OLED), ELD (electroluminescent display), TFEL (thin film electroluminescent), TDEL (thick dielectric electroluminescent), or a combination of any of the above.

In certain embodiments, the see-through near eye display can comprise transparent pixels and/or semi-transparent pixels having light blocked on the side furthest away from the eye of a wearer and having transparent or semi-transparent sections of the display between the pixels and/or pixel patches that will allow the real world light rays to pass through to the eye(s) of the wearer. In these cases, while the pixels or pixel patches may be transparent or semi-transparent, most light from the real world will not pass through the pixel or pixel patches, but rather pass between the pixels or pixel patches due to the light block located on the front side of the pixel or pixel patch, or in front of the pixel or pixel patch, furthest away from the eye of the wearer. In other cases, the pixels can be opaque. In such cases, the real-world image is seen by light rays passing between the opaque pixels. In still other cases the pixels can be transparent or semi-transparent with no light block. In these cases, the real-world image can be seen through the pixels. In embodiments disclosed herein the see-through near eye display permits the wearer thereof to see a real-world image when looking through the see-through near eye display whether the display comprises transparent or semi-transparent pixels having a light block, transparent or semi-transparent pixels without a light block, or opaque pixels. In certain cases, the pixels or pixel patches are sparsely populated. In other cases, the pixels or pixel patches are tightly populated. The see-through near eye display can be transparent or semi-transparent. The see-through near eye display can be made of a passive matrix or an active matrix.

A micro-lens array as used herein can be a static micro-lens array (whereby the micro-lenses of the micro-lens array are fixed in optical power) or that of an electronic switchable micro-lens array (whereby the micro-lenses of the micro-lens array are switchable or tunable between two different optical powers and whereby one of which can be no optical power). The following are examples only of micro-lenses of such a micro-lens array. The micro-lenses can be one or more of: plano-convex, biconvex, aspheric, achromatic, diffractive, refractive, phase wrapped Fresnel lens, Fresnel Lens, a combination of plus and minus lenses forming a Gabor Superlens, a combination of a lens and a prism, a gradient index (GRIN) lens, liquid crystal lens, a patterned electrode lens, a polymer liquid crystal lens, or any combination of the above. In most, but not all cases, the MLA (micro-lens array) is antireflection coated on one or both sides. The term lenslet(s) or lensing when used herein is meant to be associated generally with a micro-lens or micro-lens array.

A see-through near eye optical module as taught herein consists of a see-through near eye display that is in optical alignment/optical communication with a distance separated micro-lens array. In certain embodiments, the see-through near eye optical module can be a standalone see-through near eye optical module that can be fabricated prior to being incorporated with an eyewear lens. In other embodiments, the see-through near eye optical module can be fabricated in situ with the eyewear lens. The space separation of the see-through near eye display and the micro-lens array can be filled with a material or a gas. In a preferred embodiment, the space separation is filled with a material. The see-through near eye optical module can be sealed. The sealing can be hermetically sealed. By sealing it is meant that the seal incorporates all the outside area of the see-through near eye optical module. The see-through near eye display is capable of passing/transmitting real world light rays through it to form a real image as perceived by the eye of a user, while also producing or giving off light rays from the see-through near eye display that after passing through a micro-lens array form a virtual image thus allowing a user or wearer to see both a virtual image and a real image; thus perceiving Augmented Reality or Mixed Reality. The lensing array can be that of a micro-lens array or a micro-optic array. The terms patches of pixels and tiles of pixels have the same meaning for one another. As used herein, a see-through near eye optical module can also mean or be a see-through near eye optical combiner.

For clarity, the front of the see-through near eye display is the portion furthest away from the eye of the wearer/user. The back of the see-through near eye display is the portion closest to the eye of the wearer/user. Thus, by way of example only, if the see-through near eye display is embedded or attached to the front side of an eye glass lens, the front of the see-through near eye display would be on the side of the eyeglass lens farthest away from the eye of the wearer/user and the back of the see-through near eye display would be closest to the eye of the wearer/user, similar to that of the eyeglass lens (where the front is farther away from the eye of a wearer and the back is closest to the eye of a wearer).

For clarity, the front surface of the see-though near eye optical module is the portion furthest away from the eye of the wearer/user. The back surface of the see-through near eye optical module is the portion closest to the eye of the wearer/user. When the see-through near eye display optical module is embedded into the front surface of an eyeglass lens, the front surface of the see-through near eye display optical module can be conformal to the front surface of the eyeglass lens to which it is embedded. In certain other embodiments, the front surface of the see-through near eye display optical module can be slightly raised to the front surface of the eyeglass lens in which it is embedded, and in certain other embodiments the front surface of the see-through near eye display optical module can be located slightly lower within the eyeglass lens than the front surface of the eyeglass lens. In still other embodiments, the see-through near eye optical module can have its backside located adjacent to the front surface of the eyeglass lens. The front side surface of the see-through near eye optical module can be coated with, by way of example only, a scratch resistant coating, UV coating, anti-reflection coating or any combination thereof. The backside surface of the see-through near eye optical module can be, by way of example, coated with a blue light filter, a selective high energy blue light filter, a UV filter, or any combination thereof. Further, in other embodiments, the see-through near eye optical module can be entirely located in front of and distance separated from the front surface of the eyeglass lens. Finally, in certain other embodiments, the see-through near eye optical module can comprise a lens (having ophthalmic power) located behind the backside of the see-through near eye optical module. In most cases, in such an embodiment, this lens would be part of the see-through near eye optical module. In this particular case, the see-through near eye optical module may be attached to the eyewear frame or eyewear lens in such a manner to avoid being in optical communication with the eyeglass lens. By this it is meant that light rays coming from the see-through near eye optical module to the eye of the wearer would only go once through an ophthalmic lens having optical power and then to the eye of the wearer.

The see-through near eye optical module can be of any size. The see-through near eye optical module can be as small as 6 mm wide×6 mm high or as large as the eyewear lens. In most, but not all cases, the see-through near eye optical module has a top or bottom surface area less than the overall size of a side of the eyewear lens, meaning it is smaller or comprises less surface area than the surface area of a side of an eyewear lens in which is in optical communication and alignment. The see-through near eye optical module can be of any shape. In certain cases, it is rectangular. In other cases, it can be round. In still other cases, it can be square. In certain cases, the horizontal measurement is greater than the vertical measurement. In certain cases, the vertical measurement is greater than the horizontal measurement. Depending upon the size of the see-through near eye optical module, an eye tracker can be utilized. In most cases, an eye tracker can be utilized with a see-through near eye optical module that is greater than 12 mm in one direction. In certain embodiments, a see-through near eye display can be connected to a camera associated with the AR/MR system. In certain embodiments, a see-through near eye display can be connected to multiple cameras associated with the AR/MR system. The see-through near eye optical module can be connected (wirelessly or wired) to a computing device. Such a computing device can be, by way of example only, a cell phone, laptop computer, tablet computer, desktop computer, server, and/or cell tower. The see-through near eye optical module can be connected (wirelessly or wired) to a Computer Processing Unit. The see-through near eye optical module can be connected (wirelessly or wired) to the Internet.

The see-through near eye optical module in most, but not all, cases is located such that when a wearer thereof is looking straight ahead with normal gaze the line of sight of the eye of the wearer does not look through the see-through near eye optical module. In most, but not all, cases the see-through near eye optical module is located peripheral to the line of sight of the wearer when the wearer is looking straight ahead with normal gaze while wearing a see-through near eye optical module. Thus, in most cases (but not all) when the wearer wishes to see AR or MR the wearer moves his or her eye or head such to see through the see-through near eye optical module. Such movement can be, by way of example only, a head tilt or head movement. In certain embodiments, the see-through near eye optical module is placed directly in front of the eye of the wearer. When this occurs the line of sight of the wearer looks through the see-through near eye optical module when the wearer is looking straight ahead with normal gaze at far.

The see-through near eye optical module in most cases (but not all) is smaller in front surface area than that of the eyewear lens in which it is in alignment/optical communication with. The see-through near eye optical module in most cases (but not all) is smaller in back surface area than that of the eyewear lens in which it is in alignment/optical communication with. This is true in most but not all cases, when the see-through near eye optical module is attached to the front surface of an eyewear lens. This is true when the see-through near eye optical module is attached to eyewear and located in front of the front surface of an eyewear lens. This is true when the see-through near eye optical module is embedded within the front surface of an eyewear lens. This is true when the see-through near eye optical module is incorporated within an eyewear lens.

For clarity (as used herein) eyewear as used herein can be that of any eyewear or headwear that fits around and/or in front of the eyes of a wearer. By way of example only, this includes goggles, face shield, athletic glasses, dress glasses, sports glasses, shooting glasses, space goggles, welding goggles, swimming goggles, industrial glasses, safety glasses, prescription glasses, normal glasses, spectacles, and any other type of eyewear or glasses. For clarity, as used herein, an ophthalmic lens is an eyewear lens. For clarity, an eyewear lens can be a spectacle lens. For clarity, as used herein, an ophthalmic lens may be an eyeglass lens. For clarity, an eyeglass lens may be an eyewear lens. An ophthalmic lens, spectacle lens, eyeglass lens, eyewear lens, or other lens can comprise optical power. An ophthalmic lens, spectacle lens, eyeglass lens, eyewear lens, or other lens can comprise no optical power. An ophthalmic lens, spectacle lens eyeglass lens, eyewear lens, or other lens can be devoid of optical power. An eyewear lens, eyeglass lens, ophthalmic lens, or spectacle lens as used herein are all meant to mean generally the same thing. An ophthalmic lens, spectacle lens, eyeglass lens, eyewear lens, or other lens can be used with any style or type of eyewear including headwear that comprises an eyewear component. The front curvature of an ophthalmic lens can be that of the appropriate front base curve for a given lens optical power commonly known in the art. For clarity, the words optical communication used herein is that of being optically aligned so that light rays will pass through.

The term self-contained as used herein is generally meant to be that of an optical device or optical system that can be a stand-alone system that with the application of enabling power, would function. Such a self-contained system can be fabricated separately and sold as a unit that then can be attached or embedded within an eyewear lens and connected to the appropriate power source. As used herein a low index material can be, by way of example only, low index acrylics, ethyl acrylate, propyl methyl acrylate, or any combination thereof.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

FIG. 1b is a schematic diagram of a depiction of one possible embodiment of the invention as disclosed herein.

FIG. 2e is a schematic diagram of a depiction of one possible embodiment of the invention as disclosed herein.

FIG. 2f is a schematic diagram of a depiction of one possible embodiment of the invention as disclosed herein.

FIG. 3f is a schematic diagram of a depiction of one possible embodiment of the invention as disclosed herein.

FIG. 4d is a schematic diagram of a depiction of one possible embodiment of the invention as disclosed herein.

FIG. 4g is a schematic diagram of a depiction of one possible embodiment of the invention as disclosed herein.

FIG. 4h is a schematic diagram of a depiction of one possible embodiment of the invention as disclosed herein.

FIG. 7 is a schematic diagram of a depiction of one possible embodiment of the invention as disclosed herein.

DETAILED DESCRIPTION OF VARIOUS EMBODIMENTS

In most, but not all, embodiments taught herein the see-through near eye optical module is self-contained. In all embodiments disclosed herein the see-through near eye display optical module can comprise a see-through near eye display that is in optical alignment/optical communication with a micro-lens array. The micro-lens array can be that of a static micro-lens array or a switchable micro-lens array that can switch or tune its optical power between two optical powers; one of which can be plano. The see-through near eye optical module can comprise a see-through near eye display, a spacer (which can be that of air, a gas or a material that can be by way of example only a low index material), an optional light shield array, a micro-lens array, an optional spherical lens, optional cylindrical lens, or an optional sphero-cylinder lens. The sphero-cylindrical lens or cylindrical lens can be set for the correct astigmatic axis of the wear's astigmatism. The outside of the see-through near eye optical module can be coated with a multilayer coating to provide a hermetically sealed see-through near eye display optical module that is water resistant, sweat resistant and moisture resistant. The front side surface of the see-through near eye optical module can be coated with, by way of example only, a scratch resistant coating, UV coating, anti-reflection coating or any combination thereof. The backside surface of the see-through near eye optical module can be, by way of example, coated with a blue light filter, a selective high energy blue light filter, a UV filter, or any combination thereof. The eyewear frame can comprise electronics enabling the see-through near eye optical module(s). Such electronic enablement can be used for powering the electronic see-through near eye display and the micro-lens array (when such a micro-lens array is an electronic switchable or tunable micro-lens array). When the micro-lens array is static electronic enablement is not required. The eyewear frame can be attached to peripheral electronics enabling the near eye optical combiner(s).

Figure 1A:
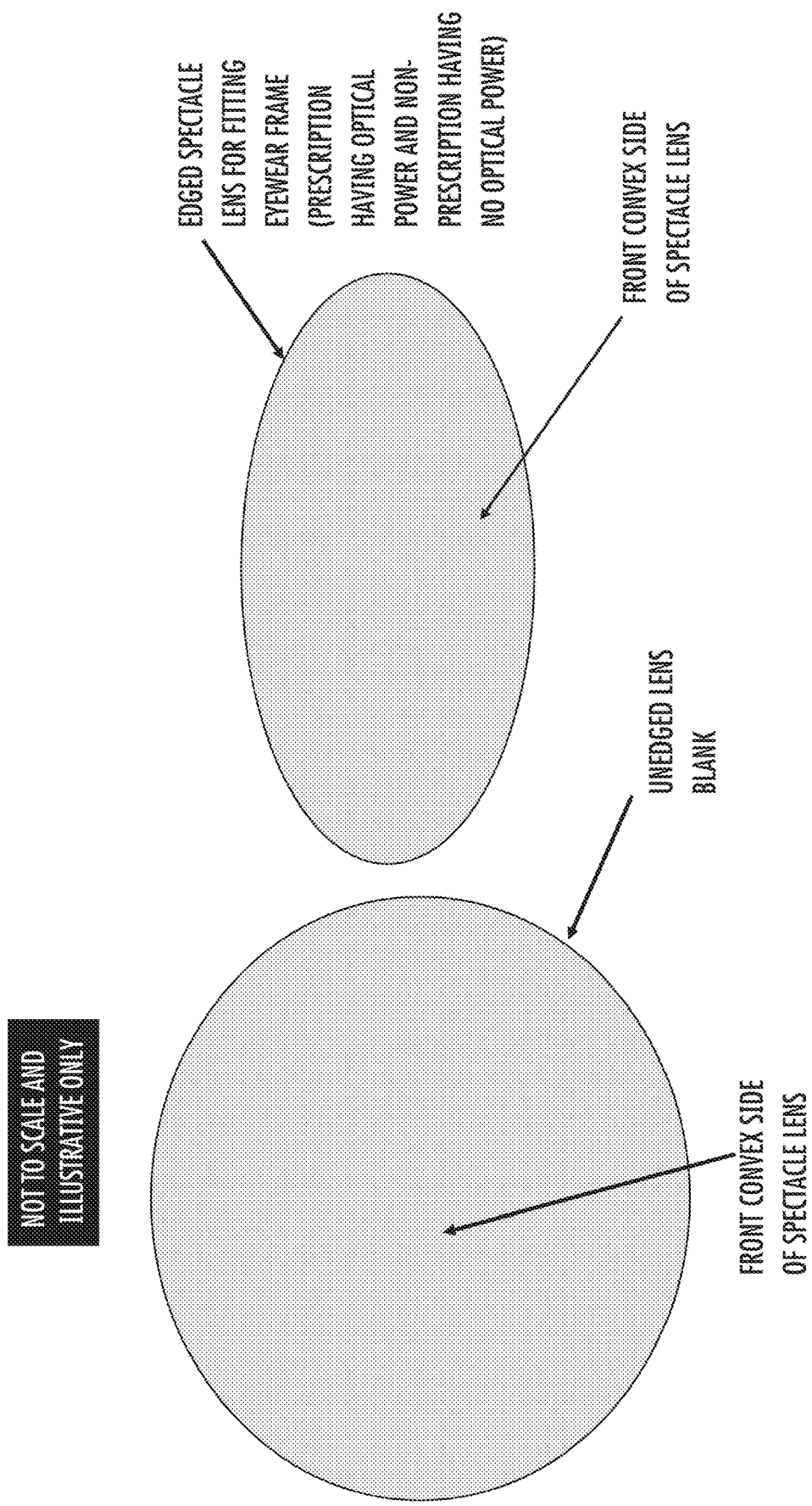
FIG. 1a is a schematic diagram of a depiction of one possible embodiment of the invention as disclosed herein.
Figure 1C:
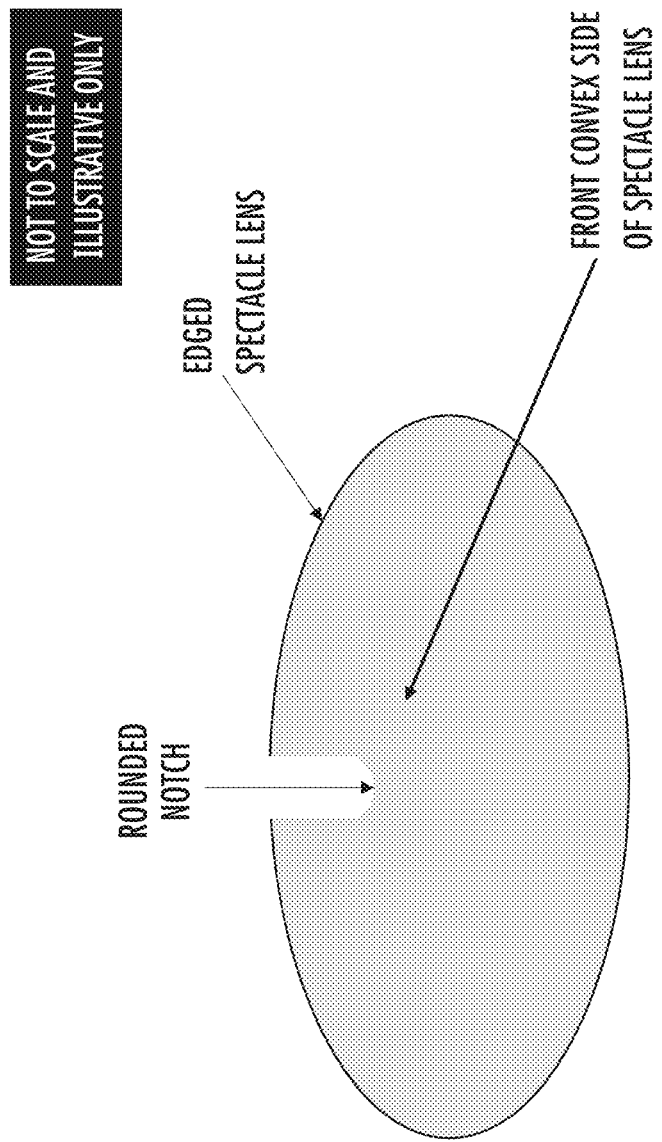
FIG. 1c is a schematic diagram of a depiction of one possible embodiment of the invention as disclosed herein.
Figure 1D:
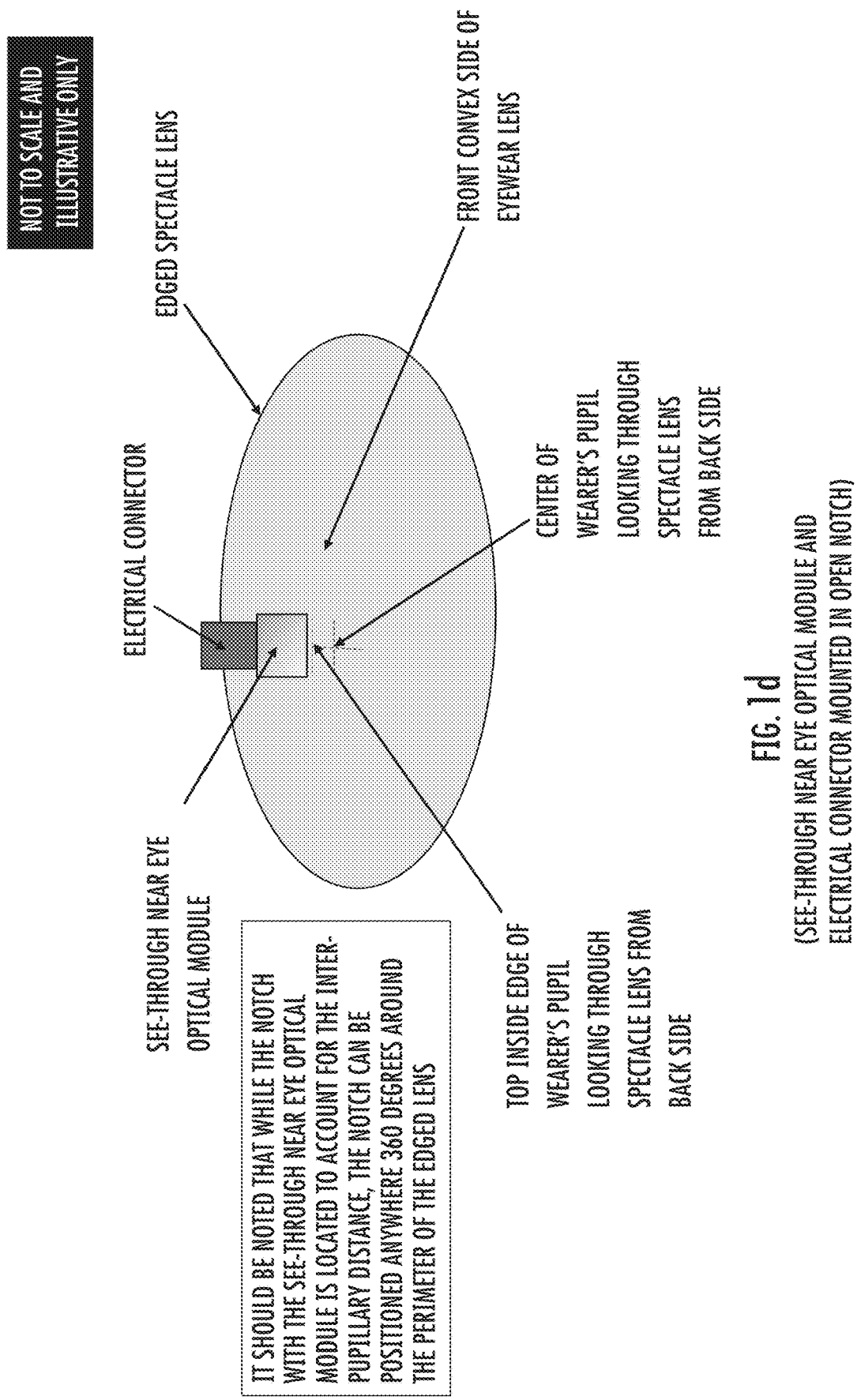
FIG. 1d is a schematic diagram of a depiction of one possible embodiment of the invention as disclosed herein.
Figure 1E:
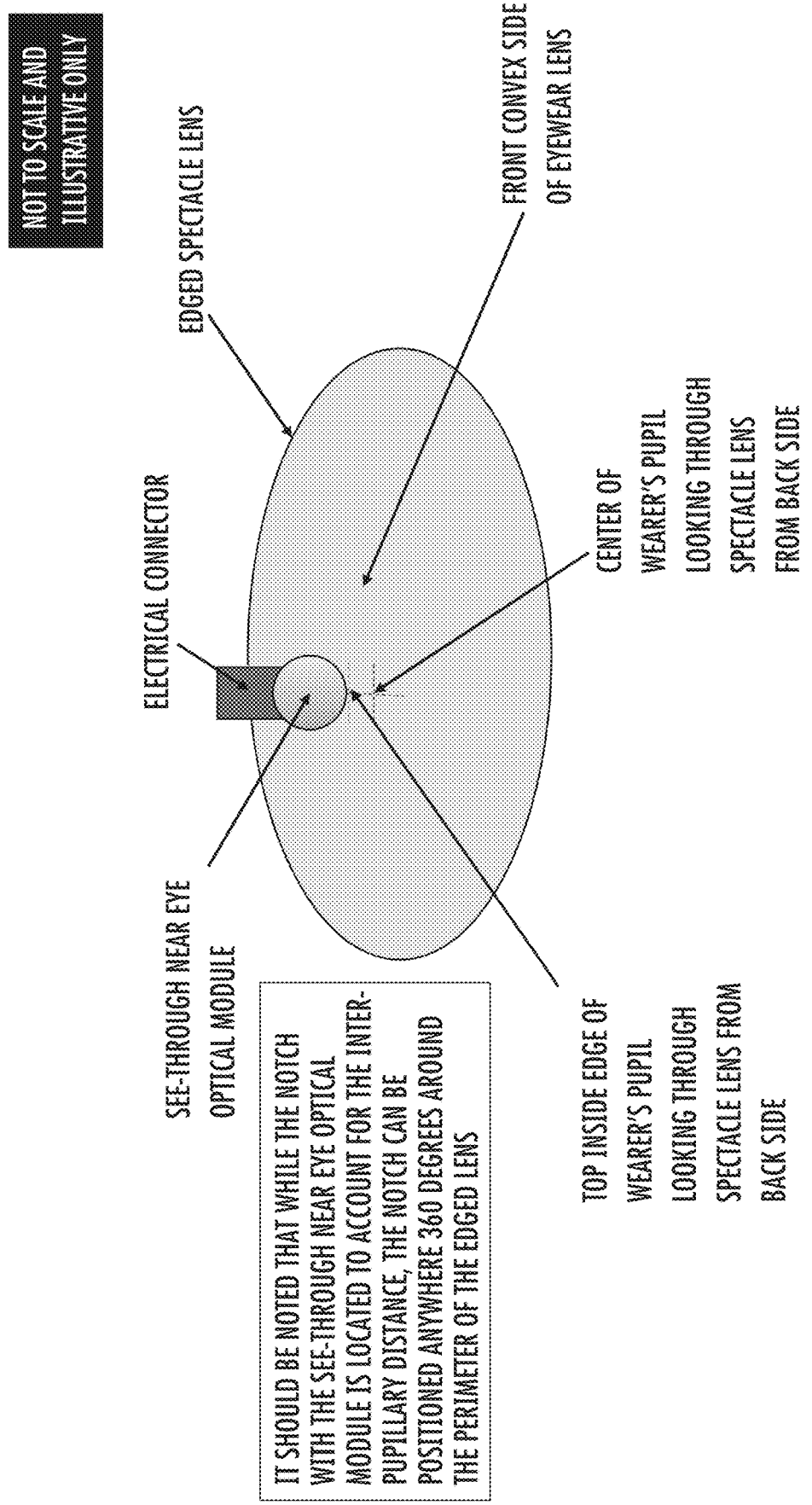
FIG. 1e is a schematic diagram of a depiction of one possible embodiment of the invention as disclosed herein.

In a preferred embodiment (see, e.g., FIGS. 1a, 1b, 1c), the device or system can be that of an eyewear lens having been edged for an eyeglass frame. The eyewear lens can then be notched at the appropriate location and have an open notch of a proper size and shape. A see-through near eye optical module can then be positioned within the open notch and attached, by way of example only, adhesively bonded or pressure mounted in place. An electrical connector (by way of example only, that of a flex cable) can be connected from the see-through near eye optical module to that of the eyewear frame where enabling electronic components including electrical power can be accessed. Prior to positioning the see-through near eye optical module into place, the front side surface of the see-through near eye optical module can be coated with, by way of example only, a scratch resistant coating, UV coating, anti-reflection coating or any combination thereof. The backside surface of the see-through near eye optical module can be, by way of example, coated with a blue light filter, a selective high energy blue light filter, a UV filter, or any combination thereof.

When an open notch is utilized, the see-through near eye display may need to utilize or incorporate an optical lens or system that is located posterior to the micro-lens array of the see-through near eye display. This optical lens or optical system provides the appropriate refractive power for the eye of the wearer (should such a refractive optical power be needed) to allow for the distance real world image to be seen clearly by the eye of the wearer. Such an optical lens or optical system can be incorporated as part of the see-through near eye optical module or can be located separately behind (closest to the eye of the wearer) the see-through near eye optical module. The appropriate refractive optical power can include, by way of example only, all required optical powers (including no optical power/plano), spherical optical power (minus or plus), cylindrical optical power (minus or plus), and/or prismatic optical power. The optical power can correct for astigmatic refractive power needs at the proper astigmatic axis. In another embodiment, the see-through near eye optical module can be attached to the eyewear frame eye rim or part of the eyewear frame eye rim. As with other embodiments of shown in FIG. 1, the appropriate refractive optical power (if required) for the eye of a wearer to see the distance real world image clearly through the see-through near eye optical module can be added behind the see-through near eye optical module, or incorporated posterior to the micro-lens array as part of the see-through near eye optical module. The appropriate refractive optical power can include, by way of example only, all required optical powers (including no optical power/plano), spherical optical power (minus or plus), cylindrical optical power (minus or plus), and/or prismatic optical power. The optical power can correct for astigmatic refractive power needs at the proper astigmatic axis.

The see-through near eye optical module can be moved along the interior of the eyewear rim to account for lining up with the wearer/user's intra pupillary distance (IPD). As in the embodiments depicted in FIG. 1, the edged lens can be notched at the appropriate location around the periphery of the edged lens. The see-through near eye optical module can then be inserted within the open notch. The see-through near eye optical module can be attached to the eyewear lens, by way of example only, adhesively or pressure mounted. The electrical connector, by way of example only, can be that of a flex cable. The flex cable can be connected from the see-through near eye optical module to that of the eyewear frame where enabling electronic components including access to electrical power can be accessed. In certain embodiments, an end of the electrical connector has male pins that connect to a female electrical connector located in or on the eyewear frame. In other embodiments, an end of the electrical connector has a female connection that connects to a male electrical connector located in or on the eyewear frame.

The see-through near eye display can be located such that the front of the see-through near eye optical module is forward relative to the front surface of the eyewear lens on the side of the notch. The see-through near eye optical module can be located such that the front of the see-through near eye display is conformal with the front surface of the eyewear lens on the side of notch. The see-through near eye optical module can be located such that the front of the see-through near eye optical module is beneath the front surface of the eyewear lens on the side of the notch.

Figure 2A:
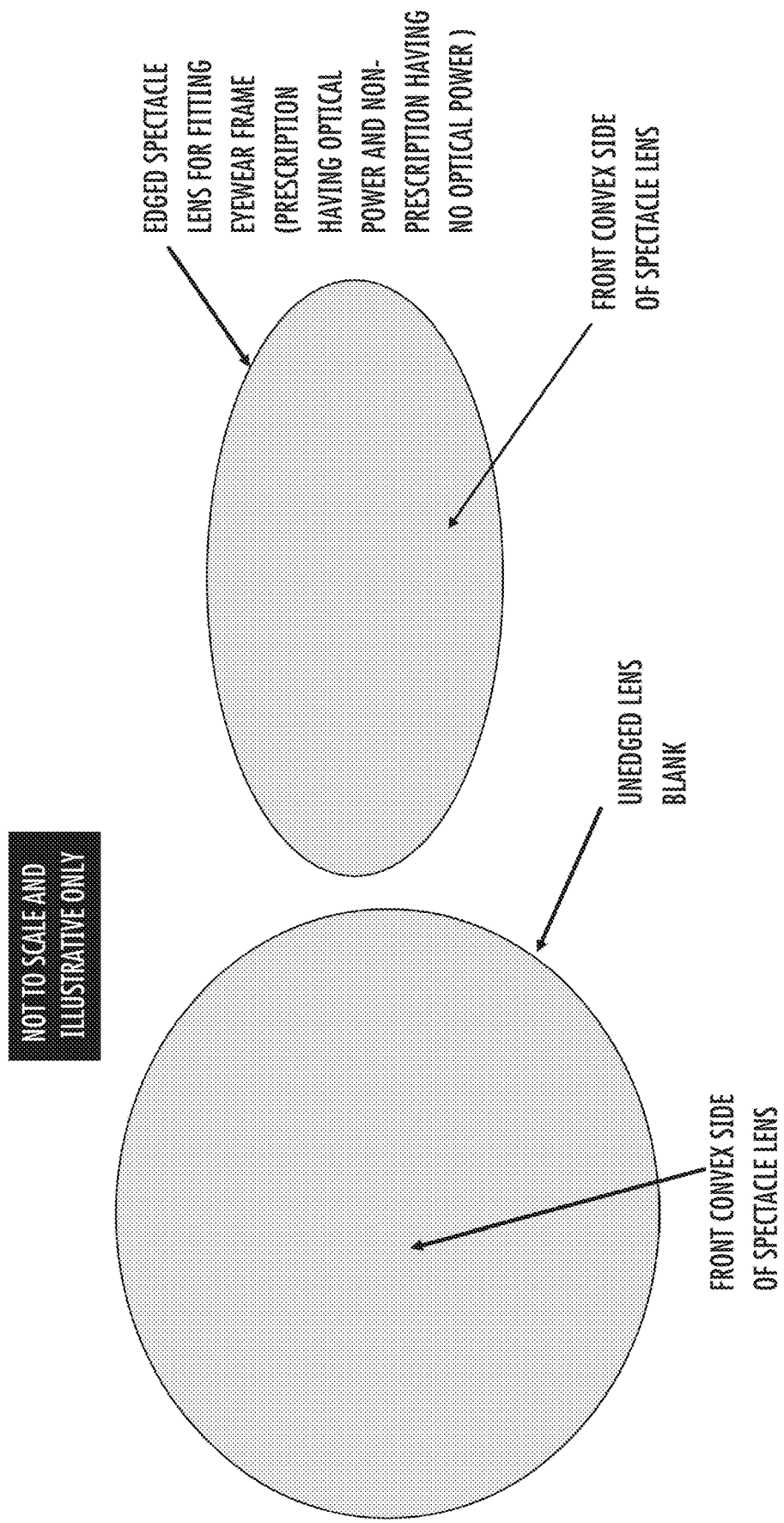
FIG. 2a is a schematic diagram of a depiction of one possible embodiment of the invention as disclosed herein.
Figure 2B:
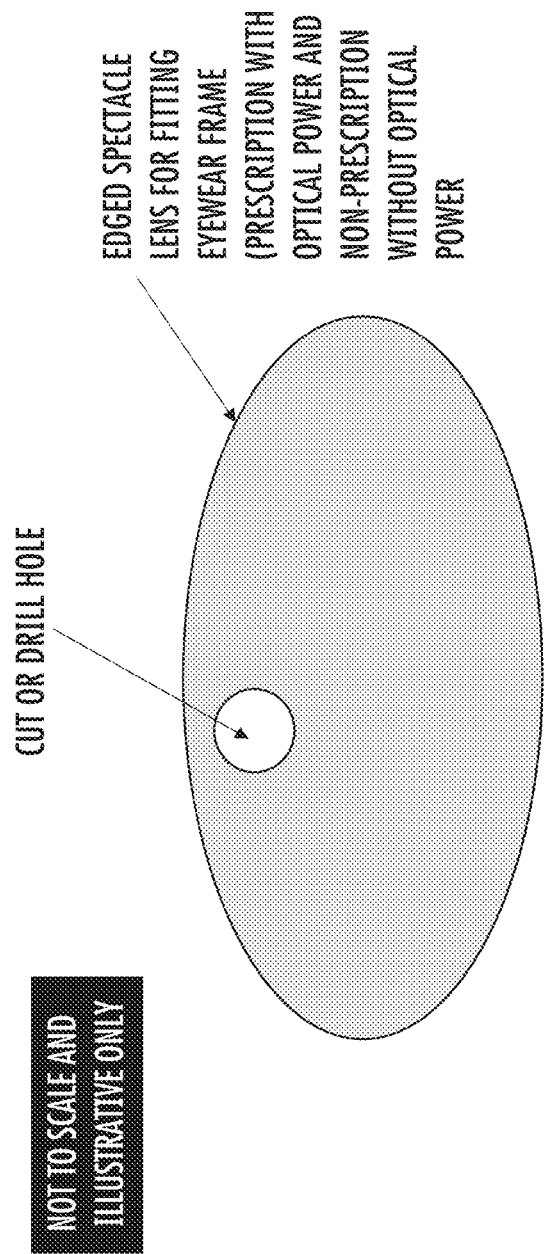
FIG. 2b is a schematic diagram of a depiction of one possible embodiment of the invention as disclosed herein.
Figure 2C:
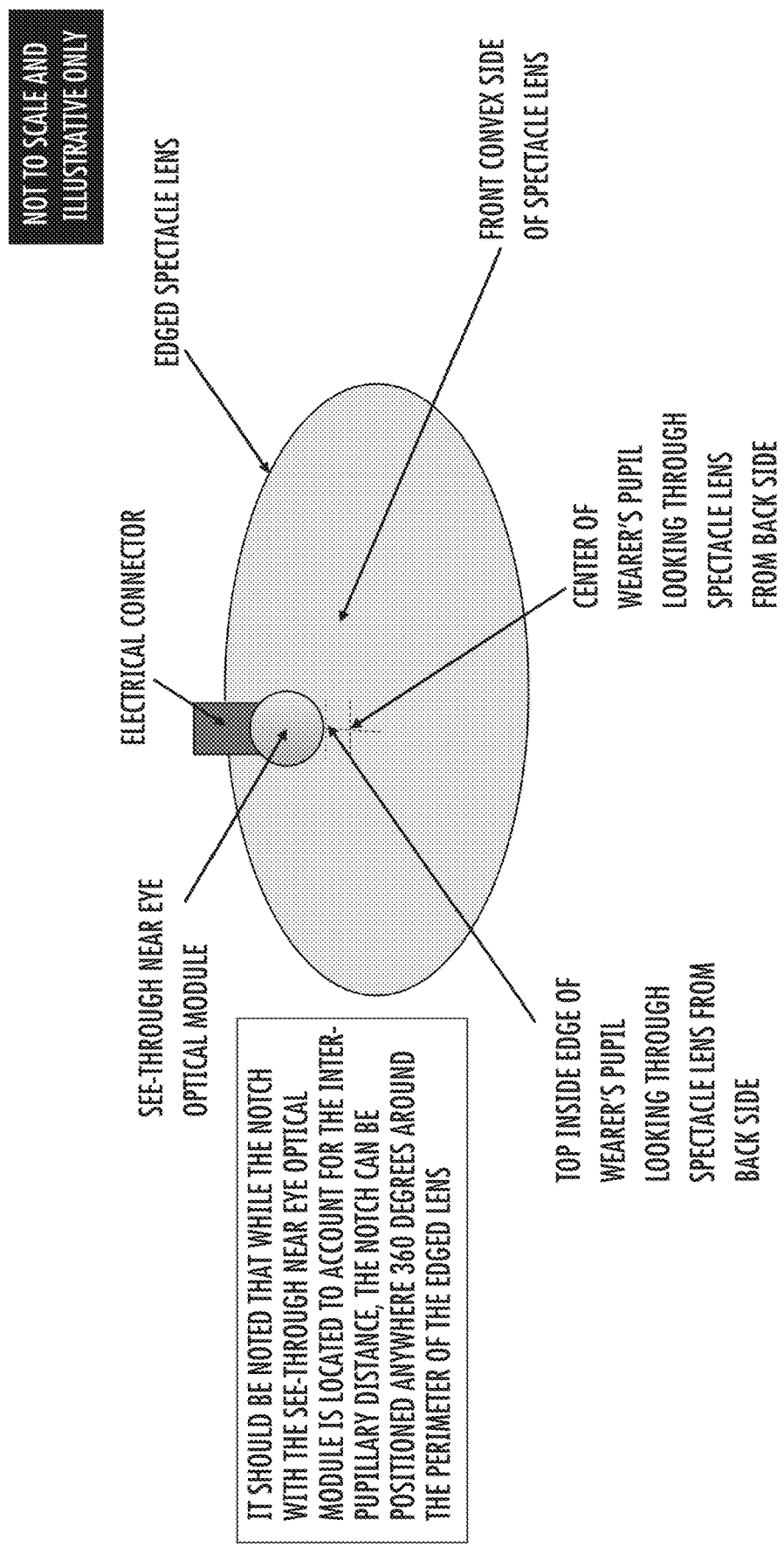
FIG. 2c is a schematic diagram of a depiction of one possible embodiment of the invention as disclosed herein.
Figure 2D:
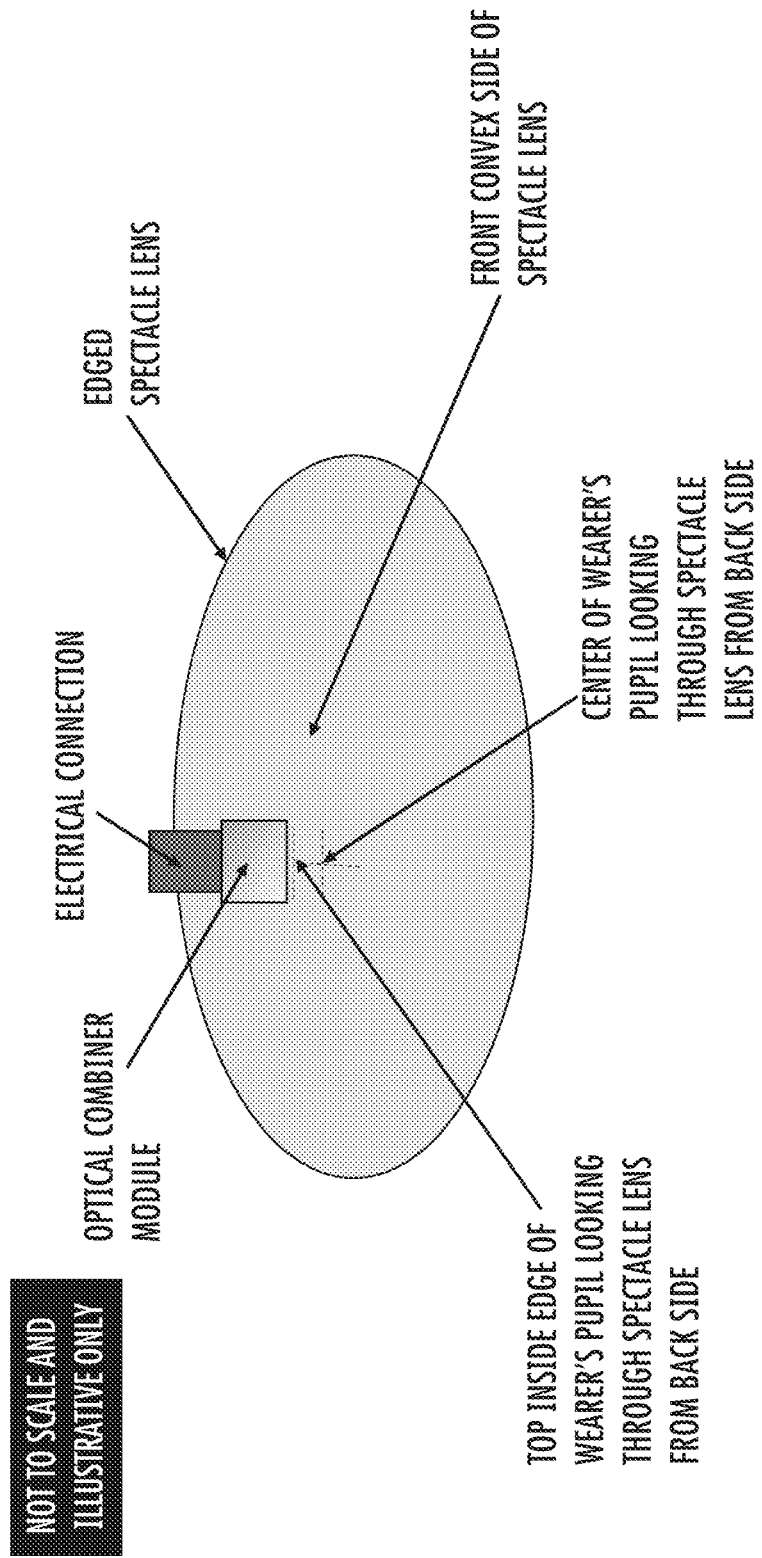
FIG. 2d is a schematic diagram of a depiction of one possible embodiment of the invention as disclosed herein.
Figure 2G:
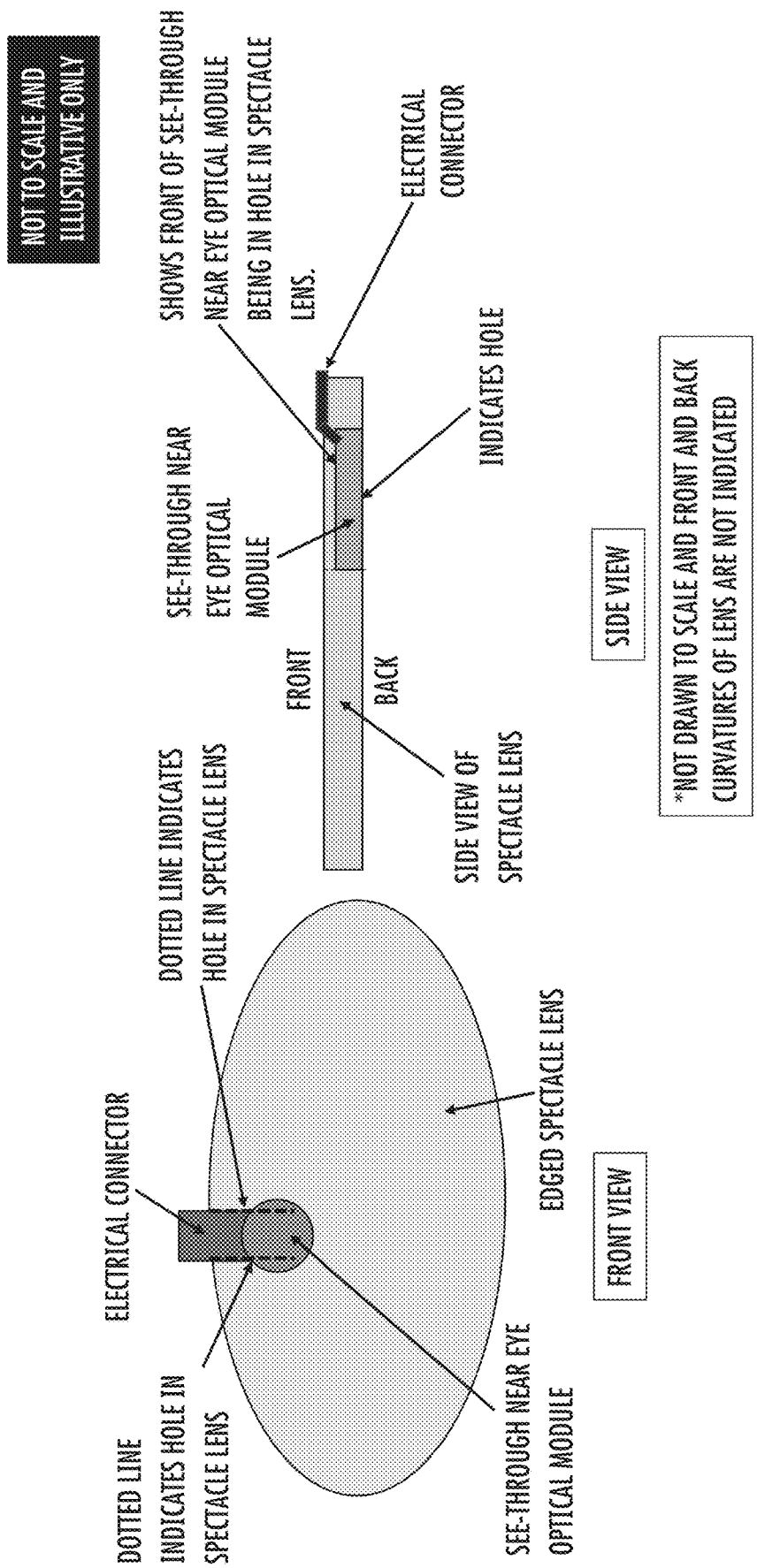
FIG. 2g is a schematic diagram of a depiction of one possible embodiment of the invention as disclosed herein.

In another embodiment (see, e.g., FIGS. 2a, 2b, and 2c), the device or system to takes an edged eyewear lens and places a hole through the eyewear lens for positioning a see-through near eye optical module. The hole, in aspects, needs to be of the size for housing the see-through near eye optical module. The hole, in aspects, needs to be located such to align the see-through near eye optical module at or above the upper edge of a pupil(s) of the eye(s) of a wearer/user. In certain cases, the hole needs to further locate the see-through near eye optical module relative to the intra-pupillary distance of the wearer. In other cases where the see-through near eye optical module is quite wide horizontally given that the optical combiner is that of a see-through near eye display optical combiner there is freedom from that of a specific location of the wearer/user's IPD. The see-through near eye optical module can be inserted within the hole and either adhesively bonded or pressure mounted into place. Prior to positioning the see-through near eye optical module into place, the front side surface of the see-through near eye optical module can be coated with, by way of example only, a scratch resistant coating, UV coating, anti-reflection coating or any combination thereof. The backside surface of the see-through near eye optical module can be, by way of example, coated with a blue light filter, a selective high energy blue light filter, a UV filter, or any combination thereof.

The see-through near eye display can be located such that the front of the see-through near eye optical module is forward relative to the front surface of the eyewear lens on the side of the hole. The see-through near eye optical module can be located such that the front of the see-through near eye display is conformal with the front surface of the eyewear lens on the side of hole. The see-through near eye optical module can be located such that the front of the see-through near eye optical module is beneath the front surface of the eyewear lens on the side of the hole.

In these kinds of embodiments, the see-through near eye optical module can be attached to the eyewear lens, by way of example only, adhesively or pressure mounted. The electrical connector, by way of example only, can be that of a flex cable. The flex cable can be connected from the see-through near eye optical module to that of the eyewear frame where enabling electronic components including access to electrical power can be housed. Also, the appropriate refractive optical power (if required) for the eye of a wearer to see the distance real world image clearly through the see-through near eye optical module can be added behind the see-through near eye optical module, or incorporated posterior to the micro-lens array as part of the see-through near eye optical module. The appropriate refractive optical power can include, by way of example only, all required optical powers (including no optical power/plano), spherical optical power (minus or plus), cylindrical optical power (minus or plus), and/or prismatic optical power. The optical power can correct for astigmatic refractive power needs at the proper astigmatic axis. The front side surface of the see-through near eye optical module can be coated with, by way of example only, a scratch resistant coating, UV coating, anti-reflection coating, or any combination thereof. The backside surface of the see-through near eye optical module can be, by way of example, coated with a blue light filter, a selective high energy blue light filter, a UV filter, or any combination thereof. Prior to positioning the see-through near eye optical module into place, the front side surface of the see-through near eye optical module can be coated with, by way of example only, a scratch resistant coating, UV coating, anti-reflection coating, or any combination thereof. The backside surface of the see-through near eye optical module can be, by way of example, coated with a blue light filter, a selective high energy blue light filter, a UV filter, or any combination thereof.

Figure 3A:
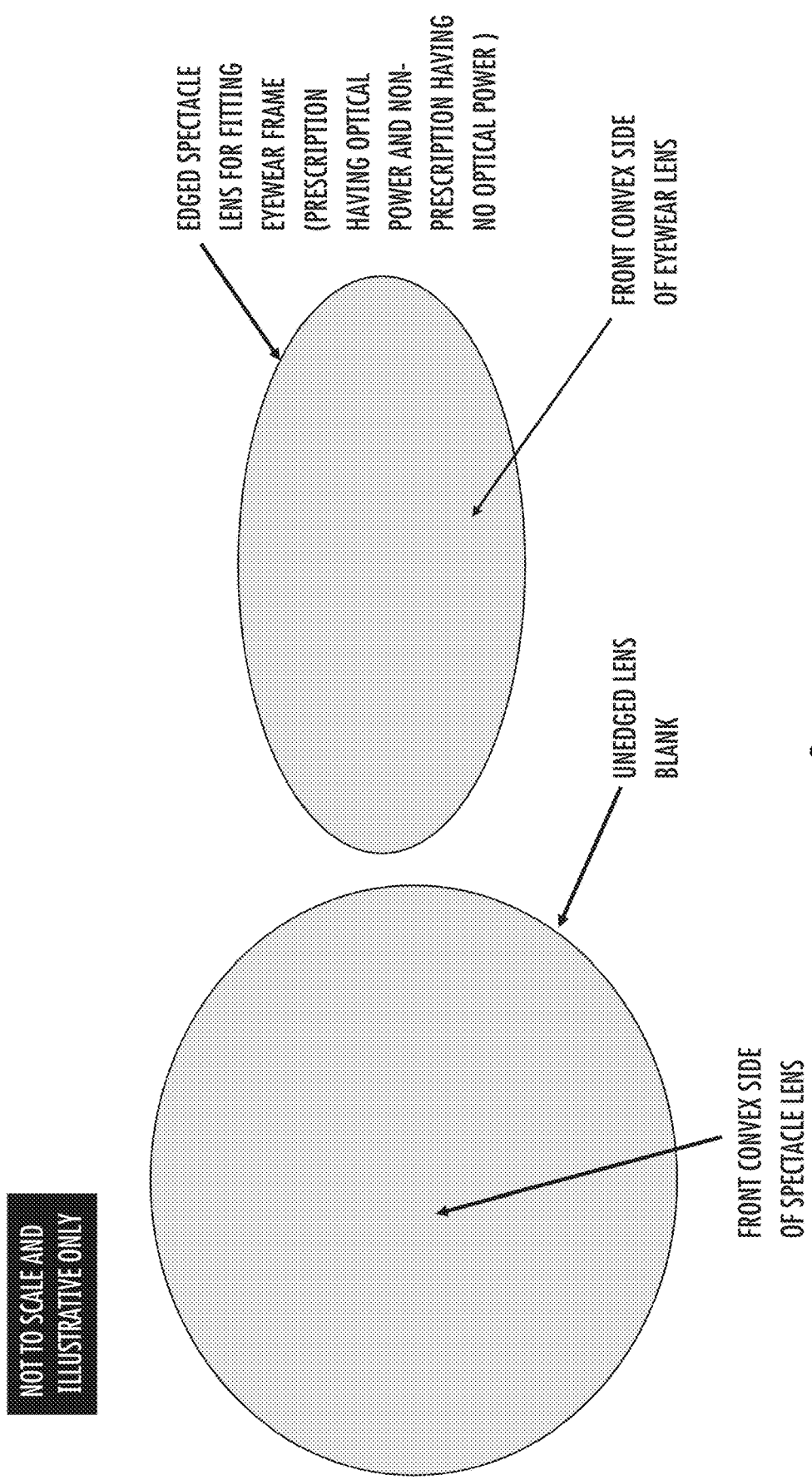
FIG. 3a is a schematic diagram of a depiction of one possible embodiment of the invention as disclosed herein.
Figure 3B:
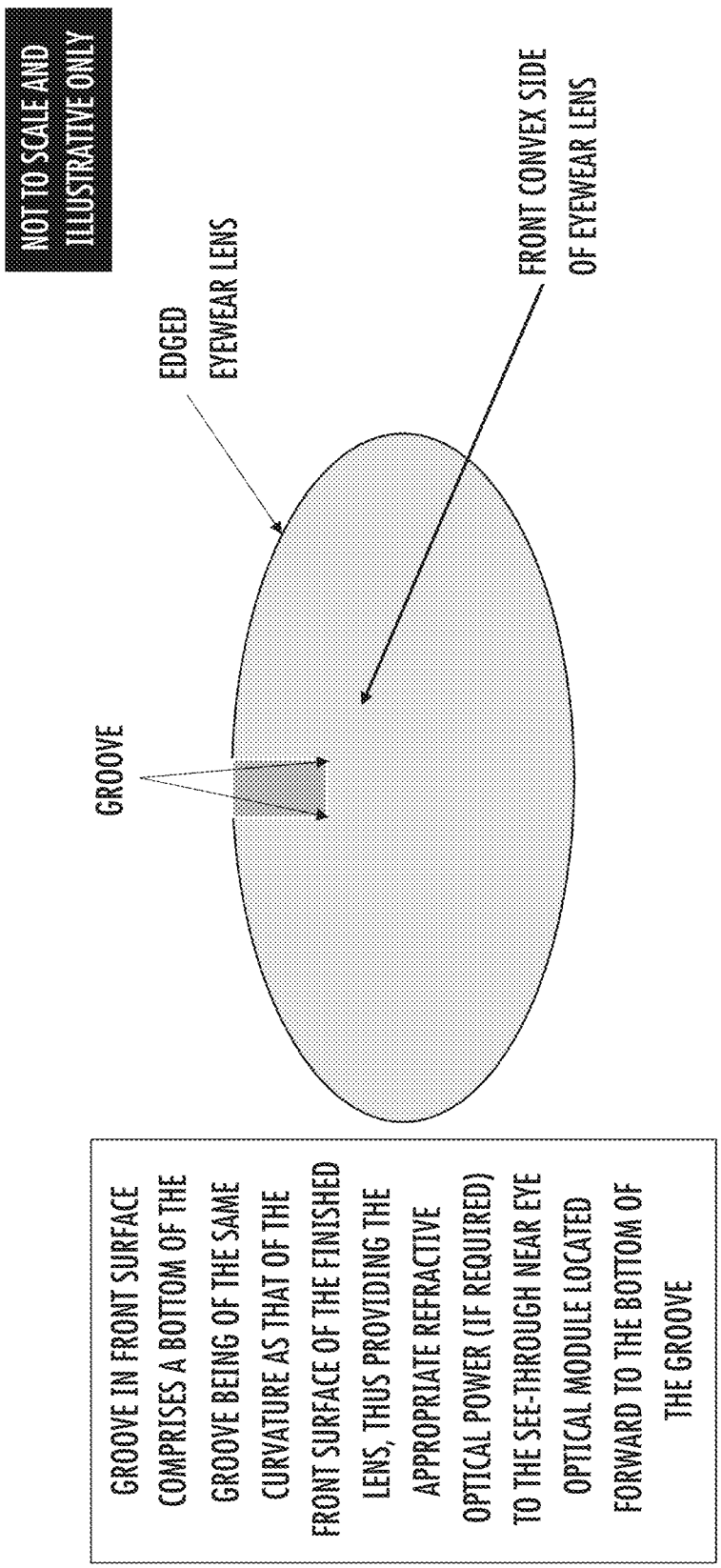
FIG. 3b is a schematic diagram of a depiction of one possible embodiment of the invention as disclosed herein.
Figure 3C:
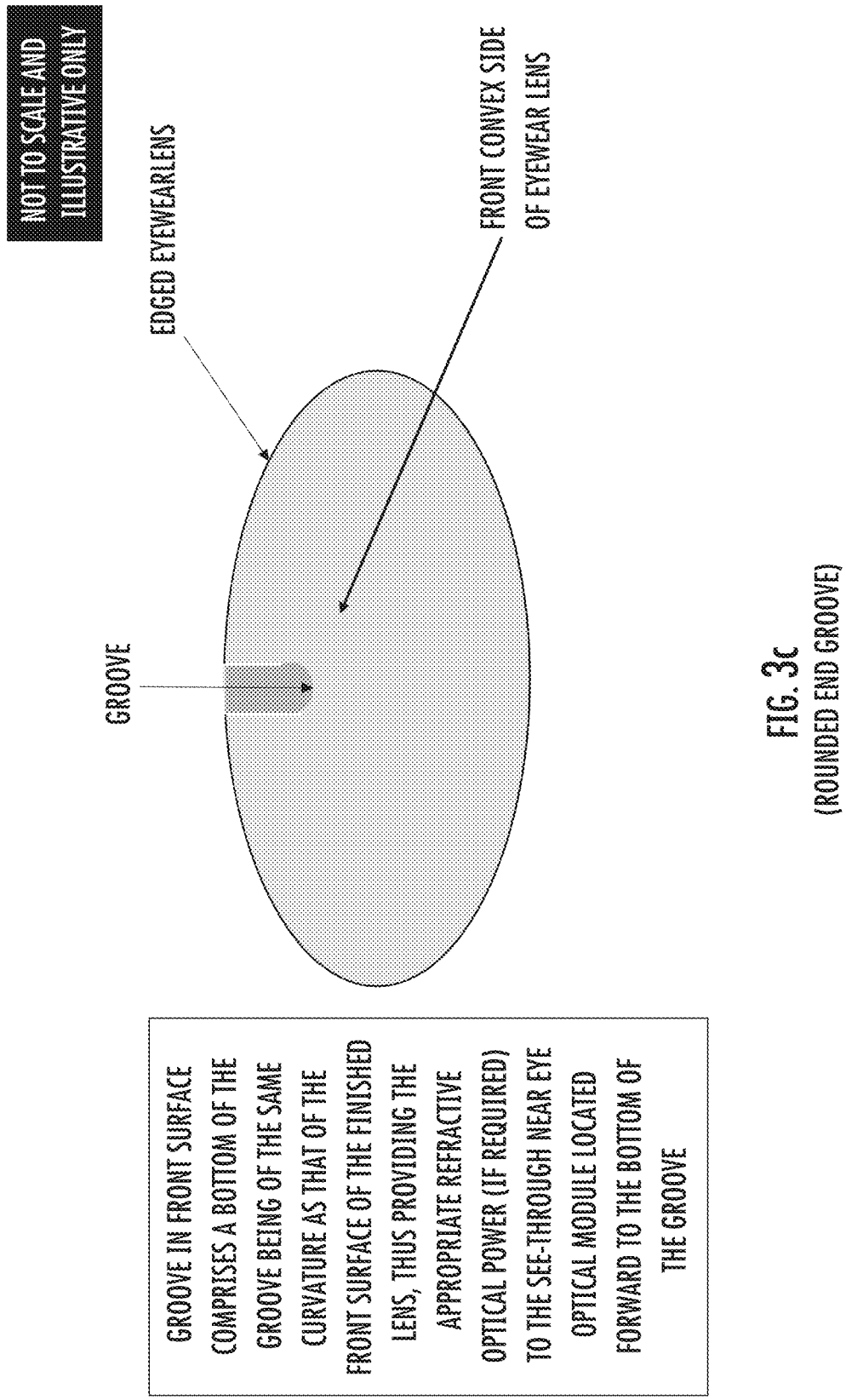
FIG. 3c is a schematic diagram of a depiction of one possible embodiment of the invention as disclosed herein.
Figure 3D:
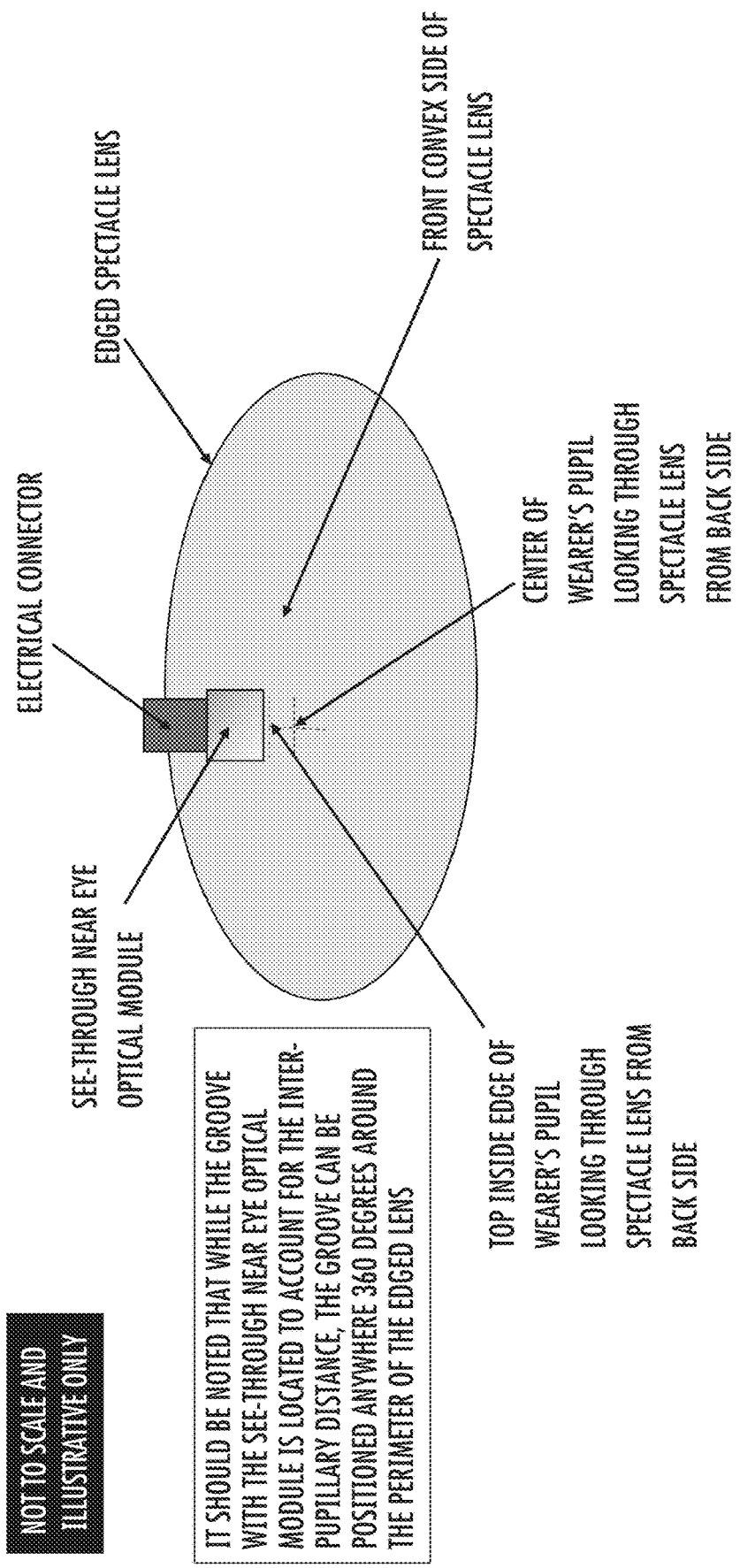
FIG. 3d is a schematic diagram of a depiction of one possible embodiment of the invention as disclosed herein.
Figure 3E:
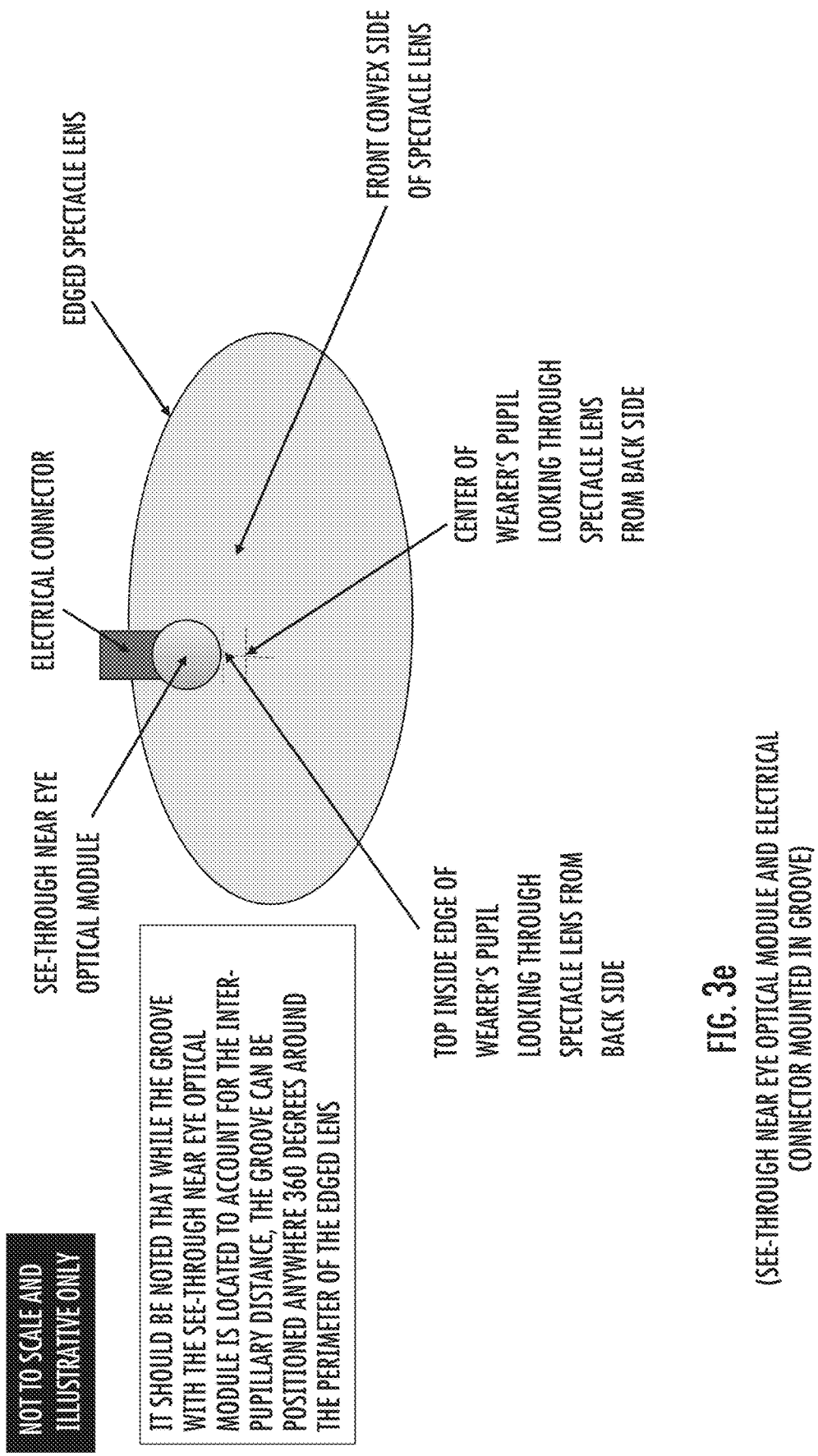
FIG. 3e is a schematic diagram of a depiction of one possible embodiment of the invention as disclosed herein.
Figure 3G:
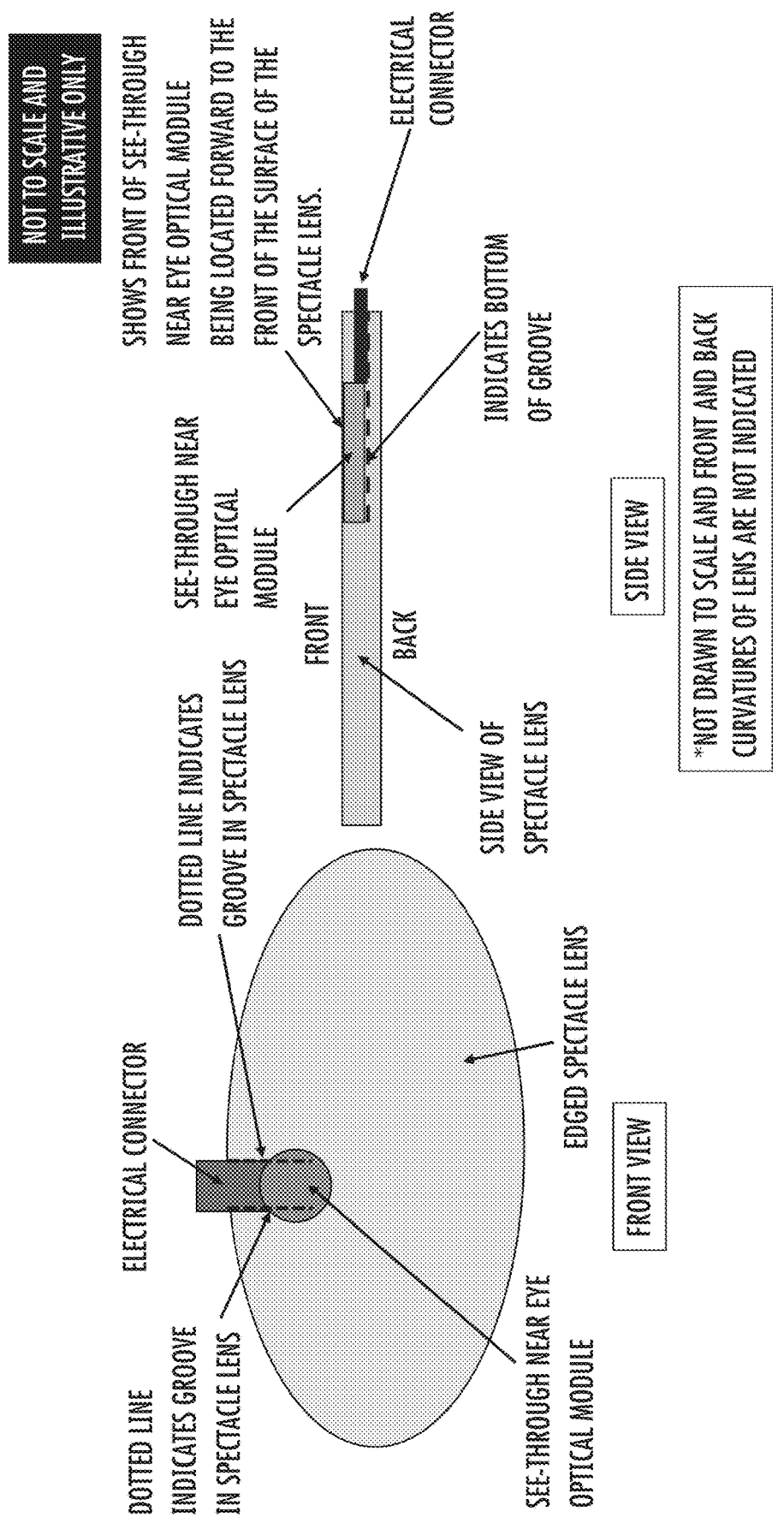
FIG. 3g is a schematic diagram of a depiction of one possible embodiment of the invention as disclosed herein.
Figure 4A:
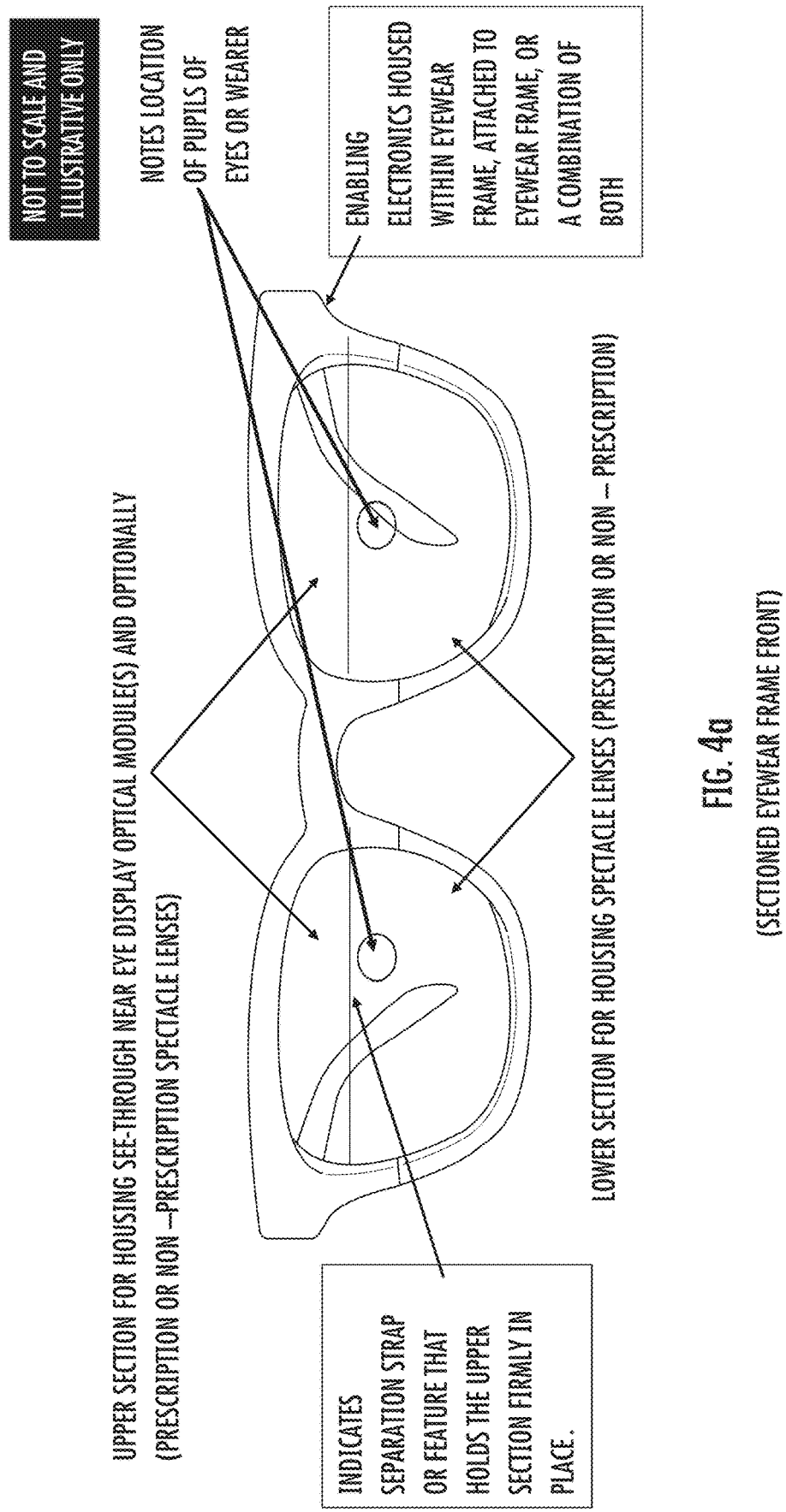
FIG. 4a is a schematic diagram of a depiction of one possible embodiment of the invention as disclosed herein.
Figure 4B:
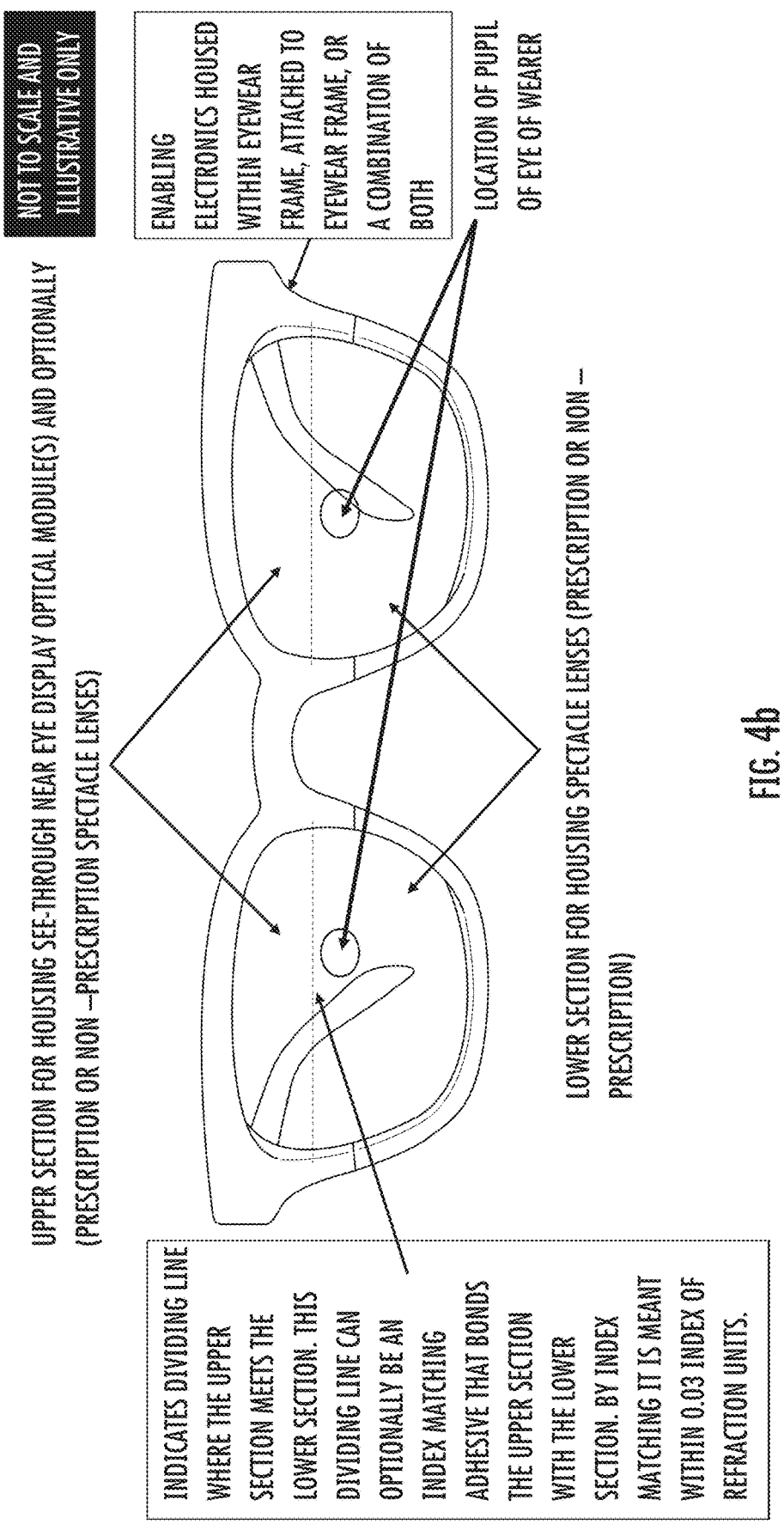
FIG. 4b is a schematic diagram of a depiction of one possible embodiment of the invention as disclosed herein.
Figure 4C:
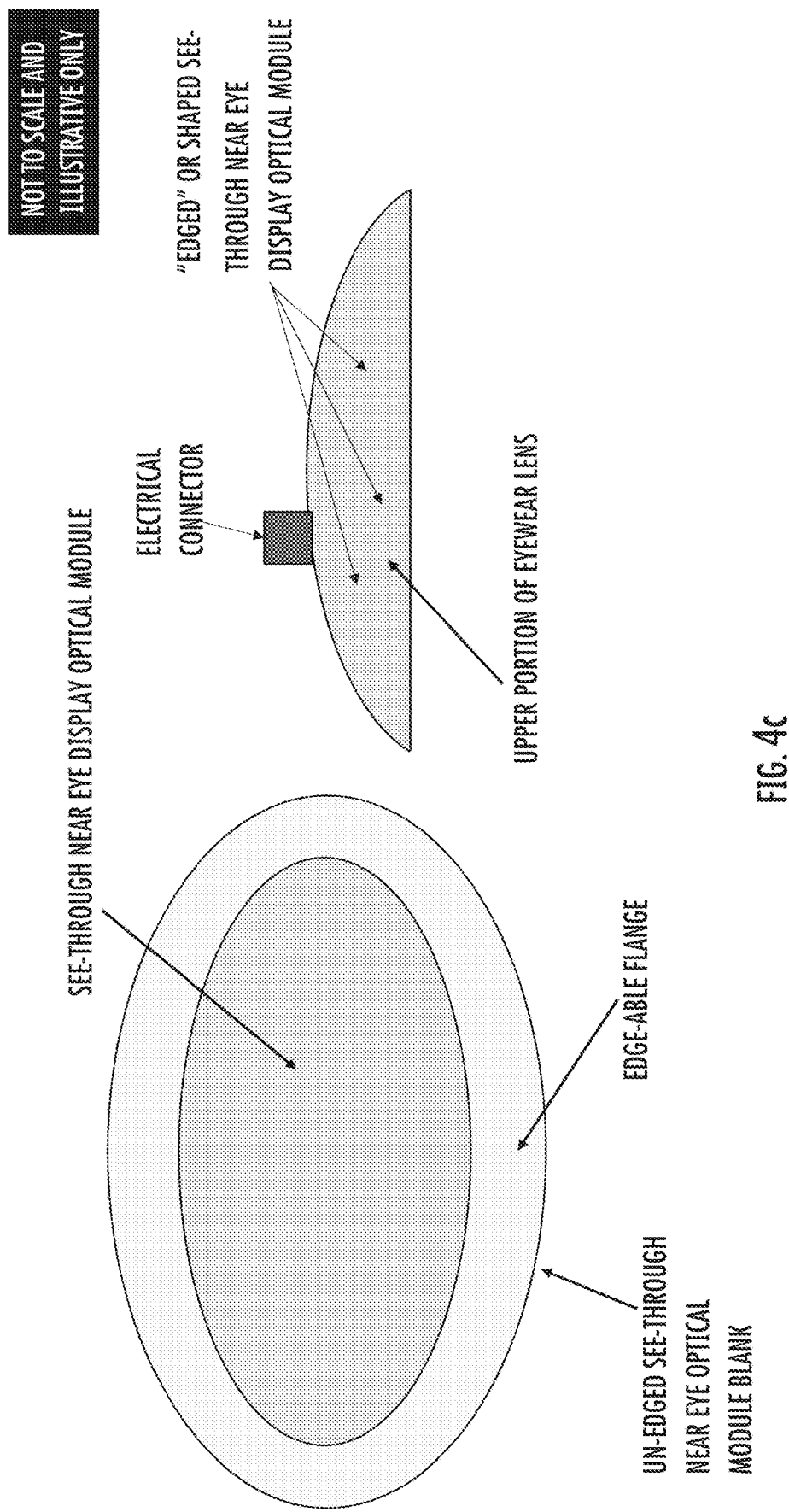
FIG. 4c is a schematic diagram of a depiction of one possible embodiment of the invention as disclosed herein.
Figure 4E:
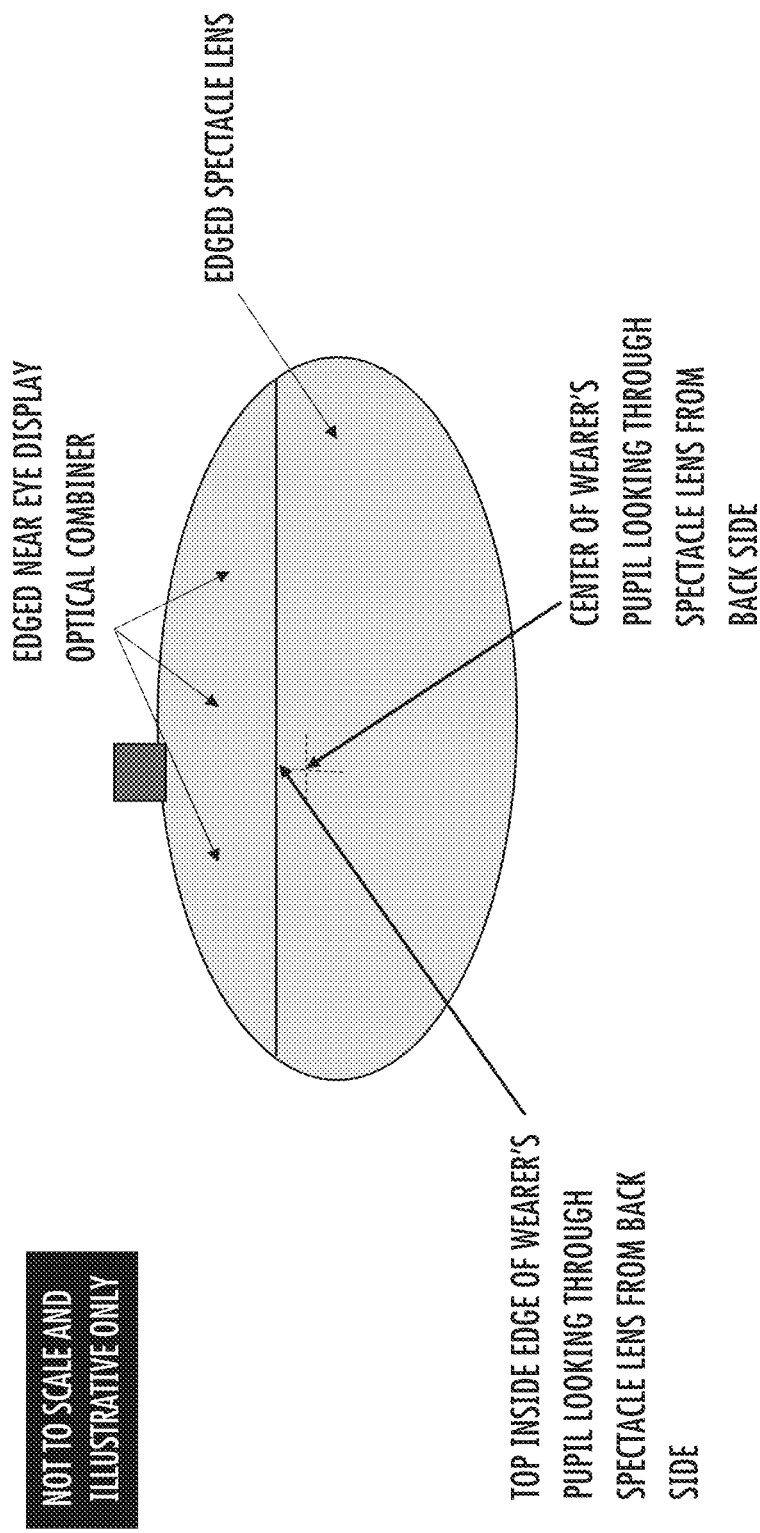
FIG. 4e is a schematic diagram of a depiction of one possible embodiment of the invention as disclosed herein.
Figure 4F:
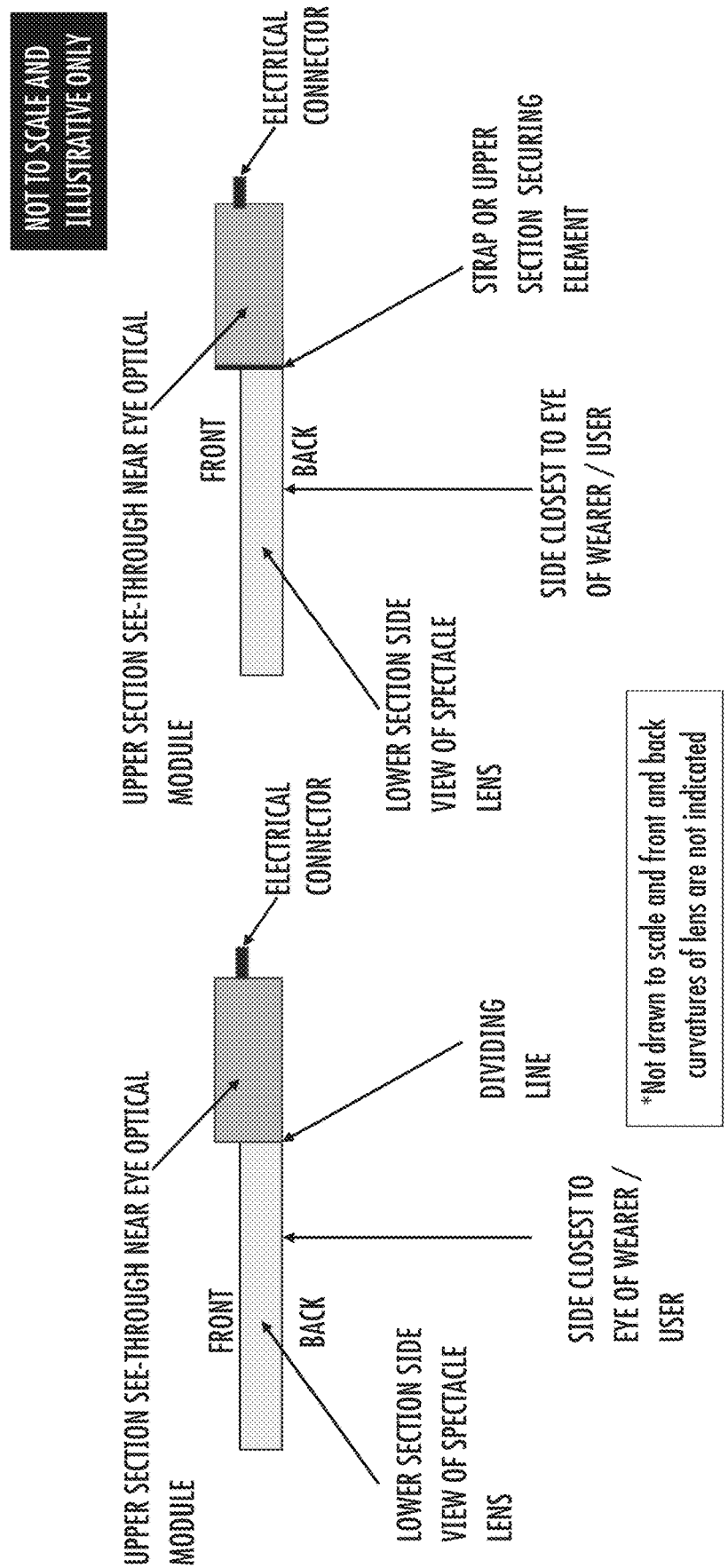
FIG. 4f is a schematic diagram of a depiction of one possible embodiment of the invention as disclosed herein.

In yet another embodiment (see, e.g., FIGS. 3a, and 3b), a groove having a bottom and sides can be fabricated within the eyewear lens. Such a groove can be fabricated, by way of example only, by way of a single point diamond turning mill. Such a diamond turning mill can fabricate the required groove curvature with a polished surface of the groove. The groove can be a recess in the front surface of the eyewear lens whereby the groove has sides on 3 out of the 4 sides. A see-through near eye display optical module and its electrical connector can be located within such a groove. The groove can originate at any point desired and located 360 degrees around the periphery of an edged or finished eyewear lens.

The lens surface curvature at the floor of the groove and the thickness of the lens from the bottom of the groove to the back of the lens can provide the optical power needed for the eye of the wearer to see a real world image clearly through the see-through near eye optical module. In certain embodiments the floor of the groove has a curvature within 20% of the curvature of the front base surface curvature of the eyewear lens prior to the groove being placed therein. The lens surface curvature at the floor of the groove and the thickness of the lens from the bottom of the groove to the back of the lens can provide the optical power needed for the eye of the wearer to see a real world image clearly through the see-through near eye display. In certain embodiments the floor of the groove has a curvature within 20% of the curvature of the front surface of the eyewear lens prior to the groove being placed therein. In other embodiments the floor of the groove has a curvature that equals the front surface base curvature of the eyewear lens. The appropriate refractive optical power can include, by way of example only, all required optical powers (including no optical power/plano), spherical optical power (minus or plus), cylindrical optical power (minus or plus), and/or prismatic optical power. The optical power can correct for astigmatic refractive power needs at the proper astigmatic axis. The overall optical power measured through the see-through near eye optical module and the eyewear lens located directly behind the see-through near eye optical module is, in aspects, within 20% of the same optical power as if it was measured through the eyewear lens prior to the see-through near eye optical module being embedded or attached. The overall optical power measured through the groove to the back of the lens, without the see-through near eye optical module in place, is, in aspects, within 20% of the same optical power as if it was measured through the eyewear lens prior to the see-through near eye optical module being embedded or attached. The overall optical power measured through the see-through near eye optical module and the eyewear lens located directly behind the see-through near eye optical module is, in aspects, within 20% of the same optical power as if it was measured through the eyewear lens prior to the see-through near eye optical module being embedded or attached. The overall optical power measured through the groove to the back of the lens, without the see-through near eye optical module in place, is, in aspects, within 20% of the same optical power as if it was measured through the eyewear lens prior to the see-through near eye optical module being embedded or attached. The overall optical power measured through the see-through near eye optical module and the eyewear lens located directly behind the see-through near eye optical module is, in aspects, within 10% of the same optical power as if it was measured through the eyewear lens prior to the see-through near eye optical module being embedded or attached. The overall optical power measured through the groove to the back of the lens, without the see-through near eye optical module in place, is, in aspects, within 10% of the same optical power as if it was measured through the eyewear lens prior to the see-through near eye optical module being embedded or attached.

The see-through near eye optical module can be attached to the eyewear lens, by way of example only, adhesively or pressure mounted. The adhesive can be a low index optical quality transparent adhesive. Such attachment can be, by way of example only, to the sides of the groove, bottom of the groove, and/or a side of the lens. As shown in embodiment shown in FIG. 3, the see-through near eye display can be located such that the front of the see-through near eye optical module is forward relative to the front surface of the eyewear lens on either side of the groove. As shown in embodiment depicted by FIG. 3, the see-through near eye optical module can be located such that the front of the see-through near eye display is conformal with the front surface of the eyewear lens on either side of the groove. When a see-through near eye optical module is positioned within a groove a low index material can be applied therebetween the see-through near eye optical module and the floor of the groove. The electrical connector, by way of example only, can be that of a flex cable. The flex cable can be connected from the see-through near eye optical module to that of the eyewear frame where enabling electronic components including electrical power can be accessed. In certain embodiments, an end of the electrical connector has male pins that connect to a female electrical connector located in or on the eyewear frame. In other embodiments, an end of the electrical connector has a female connection that connects to a male electrical connector located in or on the eyewear frame. Prior to positioning the see-through near eye optical module into place, the front side surface of the see-through near eye optical module can be coated with, by way of example only, a scratch resistant coating, UV coating, anti-reflection coating, or any combination thereof. The backside surface of the see-through near eye optical module can be, by way of example, coated with a blue light filter, a selective high energy blue light filter, a UV filter, or any combination thereof.

In another embodiment (see, e.g., FIGS. 4a, 4b, 4c, 4d, and 4e), the device or system is that of an eyewear frame, comprising an eyewear frame front having two eyewear rims and a bridge, whereby each of the eyewear rims houses a spectacle lens, whereby one of the eyewear rims comprises an upper section and a lower section and whereby the upper section houses a see-through near eye optical module and the lower section houses a spectacle lens. The eyewear of frame front can comprise two rims and both two rims comprise an upper section and a lower section. The upper section can be adjustable for the interpupillary distance of the user/wearer. The upper section can be held in place, by way of example only, with a supporting strap or member attached to the eyewear frame. The supporting strap or member can be made of by way of example only, a clear plastic, translucent plastic, nylon, metal, and/or elastic material. Alternatively, with embodiments in FIG. 4, the upper and lower sections can be joined by an index matching adhesive. The index matching optical quality transparent adhesive can be within 0.03 units of index of refraction of the upper section's index of refraction and the lower section's index of refraction. The index matching adhesive can be within the middle of index of refraction difference between that of the upper section's index of refraction and the lower section's index of refraction.

The upper section can comprise a see-through near eye optical module that comprises the user/wearer's distance spectacle prescription located behind the micro-lens array closer to the eye of the wearer. The upper section can provide the appropriate refractive optical power (if required) for the eye of a wearer to see the distance real world image clearly through the see-through near eye optical module. This refractive optical power can be added behind the see-through near eye optical module, or incorporated posterior to the micro-lens array as part of the see-through near eye optical module. The appropriate refractive optical power can include, by way of example only, all required optical powers (including no optical power/plano), spherical optical power (minus or plus), cylindrical optical power (minus or plus), and/or prismatic optical power. The optical power can correct for astigmatic refractive power needs at the proper astigmatic axis. Prior to positioning the see-through near eye optical module into place, the front side surface of the see-through near eye optical module can be coated with, by way of example only, a scratch resistant coating, UV coating, anti-reflection coating, or any combination thereof. The backside surface of the see-through near eye optical module can be, by way of example, coated with a blue light filter, a selective high energy blue light filter, a UV filter, or any combination thereof.

The upper section can be magnetically attached to a track located on an upper eyewear front's eyewear rim. The upper section can be pressure attached to a track located on an upper eyewear front's eyewear rim. The upper section can be pressure attached to the upper eyewear front's eyewear rim. The upper section can be adhesively attached to the upper eyewear front's eyewear rim. The upper section can be electrically connected to enabling electronic components located within the eyewear frame or attached to the eyewear frame which can include access to electrical power.

The lower section can be that of a section of an eyewear lens. The lower section can be that of the appropriate optical power for the eye of the wearer, including no optical power. The lower section can include, by way of example only, a progressive addition region, bifocal region, trifocal region, distance power region.

Figure 5A:
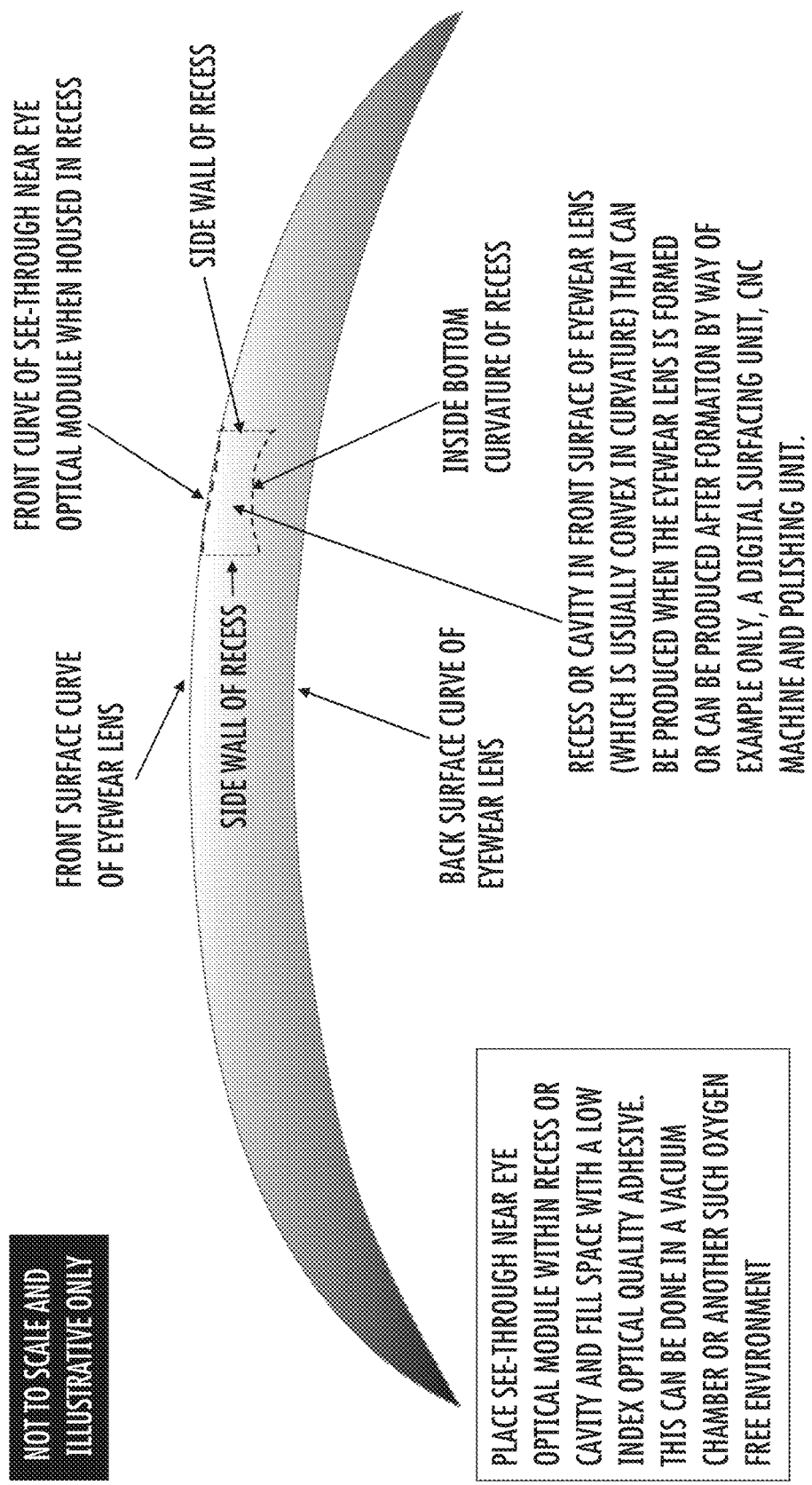
FIG. 5a is a schematic diagram of a depiction of one possible embodiment of the invention as disclosed herein.
Figure 5B:
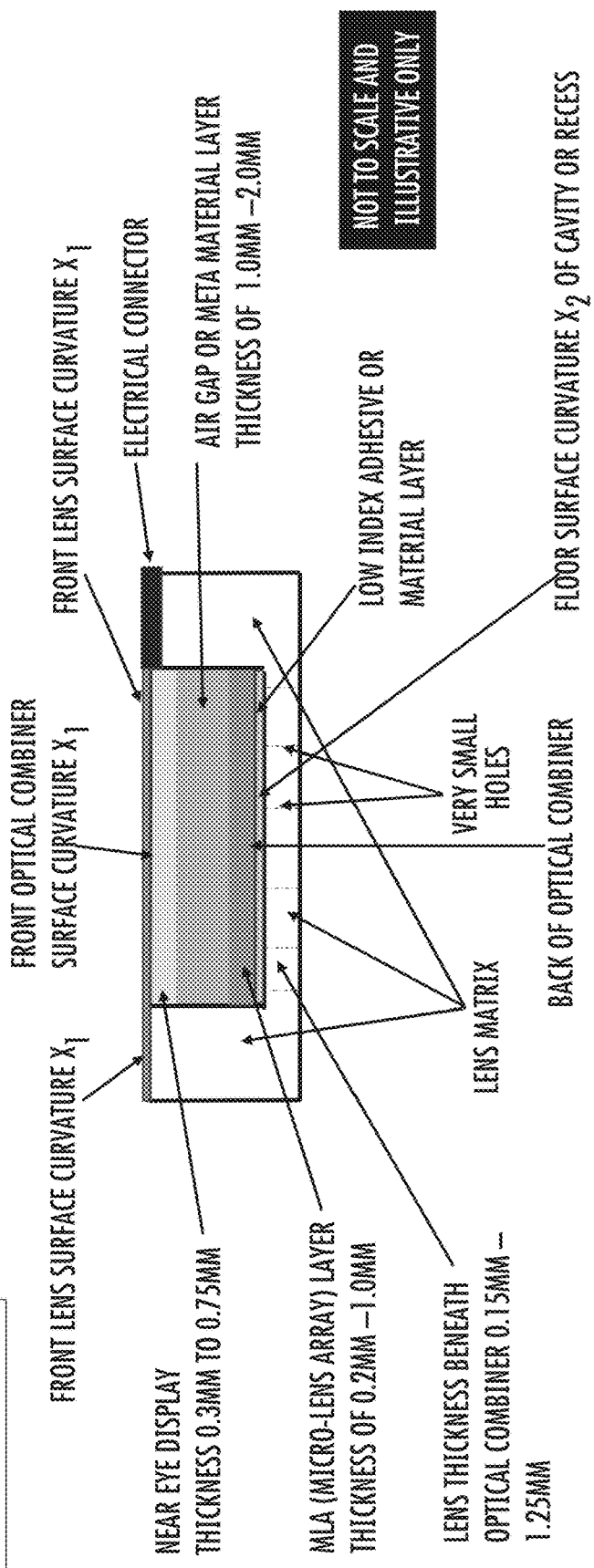
FIG. 5b is a schematic diagram of a depiction of one possible embodiment of the invention as disclosed herein.

In another embodiment (see, e.g., FIGS. 5a, and 5b), the device or system can be that of an eyewear lens comprising a front curve, back curve and thickness, wherein the eyewear lens further comprises a see-through near eye optical module, wherein the see-through near eye optical module is embedded within the eyewear lens and wherein the see-through near eye optical module has a front surface that is conformal with that of the eyewear lens front surface. The eyewear lens can have a recess or cavity within the front surface of the eyewear lens, wherein the recess houses the see-through near eye optical module. In this and related embodiments, the see-through near eye optical module can have no optical power that refracts the real-world image as seen by the eye of a wearer. The see-through near eye optical module can have a curvature of the see-through near eye optical module such that its back-surface curvature equals its front surface curvature. The recess or cavity can have an inside bottom curvature and lens thickness, located beneath this recess or cavity, that permits the portion of the eyewear lens located directly under the see-through near eye optical module to provide the same optical power as the distance portion of the eyewear lens. The recess or cavity within the front surface of the eyewear lens may be surrounded with sides around the entire periphery of the recess or cavity. Prior to positioning the see-through near eye optical module into place, the front side surface of the see-through near eye optical module can be coated with, by way of example only, a scratch resistant coating, UV coating, anti-reflection coating, or any combination thereof. The backside surface of the see-through near eye optical module can be, by way of example, coated with a blue light filter, a selective high energy blue light filter, a UV filter, or any combination thereof.

The optical power of the lens portion measured directly through the recess or cavity and the back of the lens without the see-through near eye optical module present can be of the appropriate refractive optical power (if required) for the eye of a wearer to see the distance real world image clearly through the see-through near eye optical module when the see-through near eye optical module is present. This appropriate refractive optical power can include, by way of example only, all required optical powers (including no optical power/plano), spherical optical power (minus or plus), cylindrical optical power (minus or plus), and/or prismatic optical power. The optical power can correct for astigmatic refractive power needs at the proper astigmatic axis.

The recess or cavity can have an inside bottom curvature opposite and close to the back curvature of the see-through near eye optical module that is within 10% of that of the front surface curvature of the eyewear lens that was replaced by the recess or cavity. In this and related embodiments, the overall optical power measured through the see-through near eye optical module and the eyewear lens located directly behind the see-through near eye optical module is, in aspects, within 20% of the same optical power as the distance portion of the eyewear lens.

In this and related embodiments, the overall optical power measured through the see-through near eye optical module and the eyewear lens located directly behind the see-through near eye optical module is, in aspects, within 20% of the same optical power as if it was measured through the eyewear lens prior to the see-through near eye optical module being embedded or attached. The overall optical power measured through the recess or cavity to the back of the lens, without the see-through near eye optical module in place, is, in aspects, within 20% of the same optical power as if it was measured through the eyewear lens prior to the see-through near eye optical module being embedded or attached.

In certain embodiments, when the front surface curvature of the see-through near eye optical module does not equal its back surface curvature, the recess surface curvature closest to the back of the see-through near eye optical module (floor of the recess or cavity) can be altered to allow for the overall optical power measured through the see-through near eye optical module and the eyewear lens directly behind to be the desired optical power for the eye of the wearer when looking at far. In certain embodiments, when the front surface curvature of the see-through near eye optical module does not equal its back surface curvature, the recess surface curvature closest to the back of the see-through near eye optical module can be altered to allow for the overall optical power measured through the see-through near eye optical module and the eyewear lens directly behind to be the desired optical power for the eye of the wearer to clearly see the real image and/or the virtual image.

In a certain embodiment, the ophthalmic lens portion that is closest to the back side of see-through near eye optical module is curved or shaped within 20% of the front surface base curvature of the ophthalmic lens to which the see-through near eye optical module has been positioned or has replaced, and wherein the backside size of the see-through near eye optical module is smaller in surface area compared to the surface area of the front surface of the ophthalmic lens. In a certain embodiment, the ophthalmic lens portion that is closest to the back side of see-through near eye optical module is curved or shaped within 20% of the front surface curvature of the ophthalmic lens to which the see-through near eye optical module has been positioned or has replaced, and wherein the backside size of the see-through near eye optical module is smaller in surface area compared to the surface area of the front surface of the ophthalmic lens.

The inside bottom surface of the recess or cavity's surface curvature can be that of a finished curvature. The inside bottom recess curvature can be polished. By way of example only, a single point diamond turning mill can fabricate such a recess or cavity to the desired curvature and thickness, while also providing for a finished polished surface curvature at the bottom surface of the recess or cavity. In certain embodiments, the see-through near eye optical module can be embedded within the front surface of the eyewear lens in such a way that there is an air gap between the back of the see-through near eye optical module and the inside bottom of the recess or cavity of the eyewear lens. In another embodiment, instead of an air gap, a low index material can be used. Such a low index mater can be, by way of example only, one of low index acrylics, ethyl acrylate, and/or propyl methyl acrylate.

An electrical connector can connect the see-through near eye optical module to the appropriate enabling electronic components including that of electrical power. The electrical connector, by way of example only, can be that of a flex cable. The flex cable can be connected from the see-through near eye optical module to that of the eyewear frame. In certain embodiments, an end of the electrical connector has male pins that connect to a female electrical connector located in or on the eyewear frame. In other embodiments, an end of the electrical connector has a female connection that connects to a male electrical connector located in or on the eyewear frame.

In still another embodiment (see, e.g., FIG. 5), the inside bottom curvature of recess or cavity can be comprised of a micro-lens array being made of a low index material (being a different refractive index than that of the index of the spectacle lens) having its micro-lenses aligned with the pixels or pixel patches of the see-through near eye display which is distance separated having an air gap or spacer material therebetween. In such an embodiment the see-though near eye optical module is assembled and properly aligned within the eyewear lens and becomes integrated with the eyewear lens.

With each of the above embodiments in which the see-through near eye optical module is embedded within the eyewear lens, the eyewear lens in which it is embedded can be made of any ophthalmic grade lens material, by way of example only, CR 39, Polycarbonate, Trivex, 1.67 high index, and/or 1.72 high index. Holes ranging in diameter from 2 microns to less than a micron can optionally be added within the eyewear lens material thickness located directly beneath the see-through near eye optical module, that being the recess surface and the back surface of the lens. These holes allow air or gas to exit when pressing the optical combiner module into the recess or cavity. The holes can be fabricated by way of a laser, mechanical drill, and/or chemical etching. In some cases, an optical quality transparent adhesive material can be utilized to adhere the see-through near eye display optical material within the formed front surface recess. Such an adhesive material can be of an index that is halfway or near halfway between that of the index of the outer coating of the see-through near eye optical module and the eyewear lens. Such an adhesive material can be of a refractive index that is within 0.03 units of refraction of the index of the outer coating of the see-through near eye optical module and/or the eyewear lens. In related embodiments, the front surface of the see-through near eye optical module can be conformal to the front surface curvature of the spectacle lens. The front surface of the see-through near eye optical module can be located slightly above the front surface curvature of the spectacle lens. The front surface of the see-through near eye optical module can be located slightly below the front curvature of the spectacle lens. The entire front surface of the spectacle lens can comprise an anti-refection coating. In certain embodiments the front surface of the see-through near eye display optical module comprises an anti-reflection coating. Prior to positioning the see-through near eye optical module into place, the front side surface of the see-through near eye optical module can be coated with, by way of example only, a scratch resistant coating, UV coating, anti-reflection coating, or any combination thereof. The backside surface of the see-through near eye optical module can be, by way of example, coated with a blue light filter, a selective high energy blue light filter, a UV filter, or any combination thereof.

In certain embodiments the recess or cavity acts as the sides and bottom of the see-through near eye optical module and the see-through near eye display sits within the top of the recess or cavity with its front surface conformal to the front surface curvature of the eyewear lens. In other embodiments the recess or cavity houses a self-contained near eye optical module. The front surface of the see-through near eye display optical module can be under the front surface of the eyewear lens. The front surface of the see-through near eye optical module can be of an equal or within 20% of the curvature to that of the front curvature of the eyewear lens where it is embedded. The front surface of the see-through near eye optical module can be adjacent to the front surface of the eyewear lens.

Figure 5C:
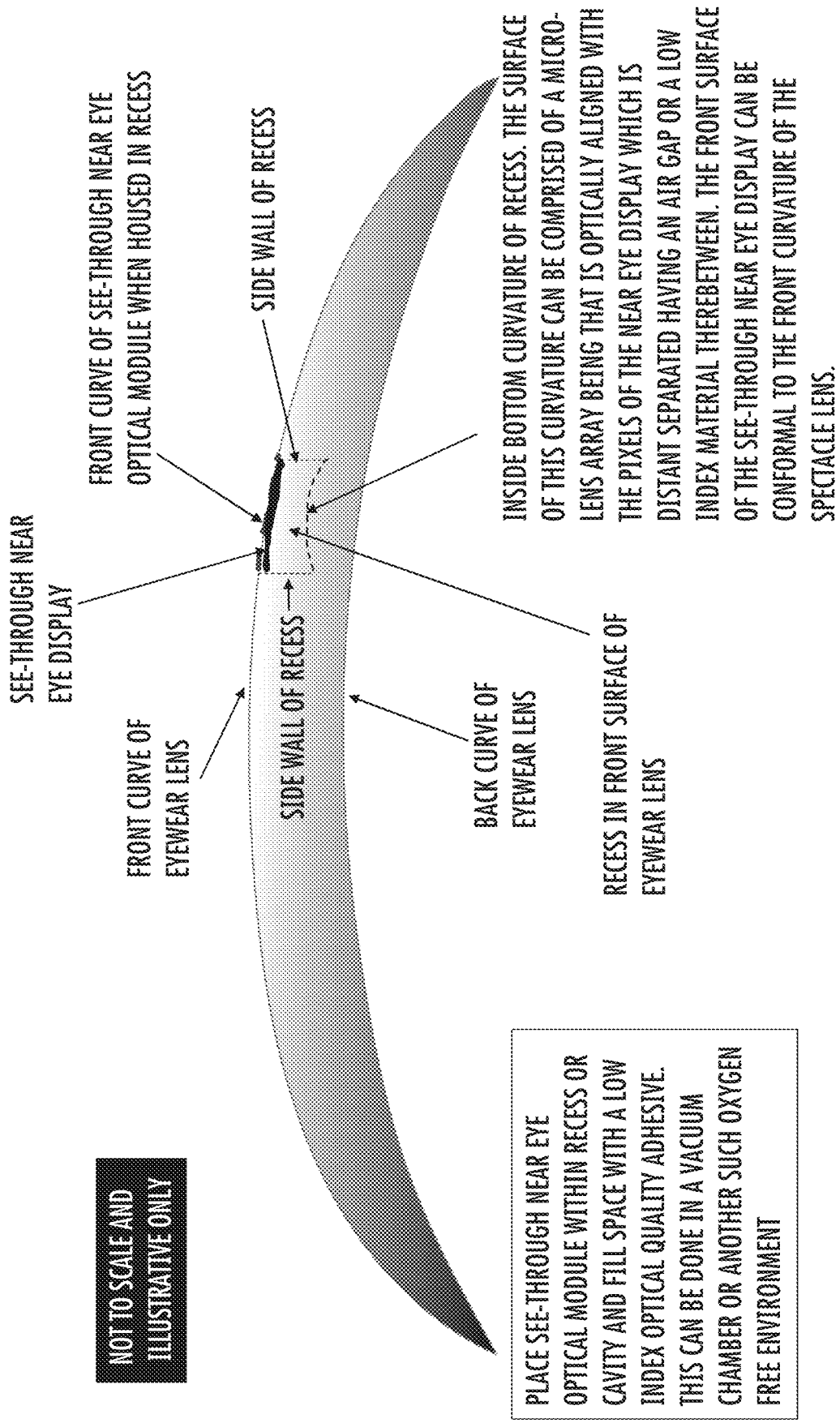
FIG. 5c is a schematic diagram of a depiction of one possible embodiment of the invention as disclosed herein.
Figure 6A:
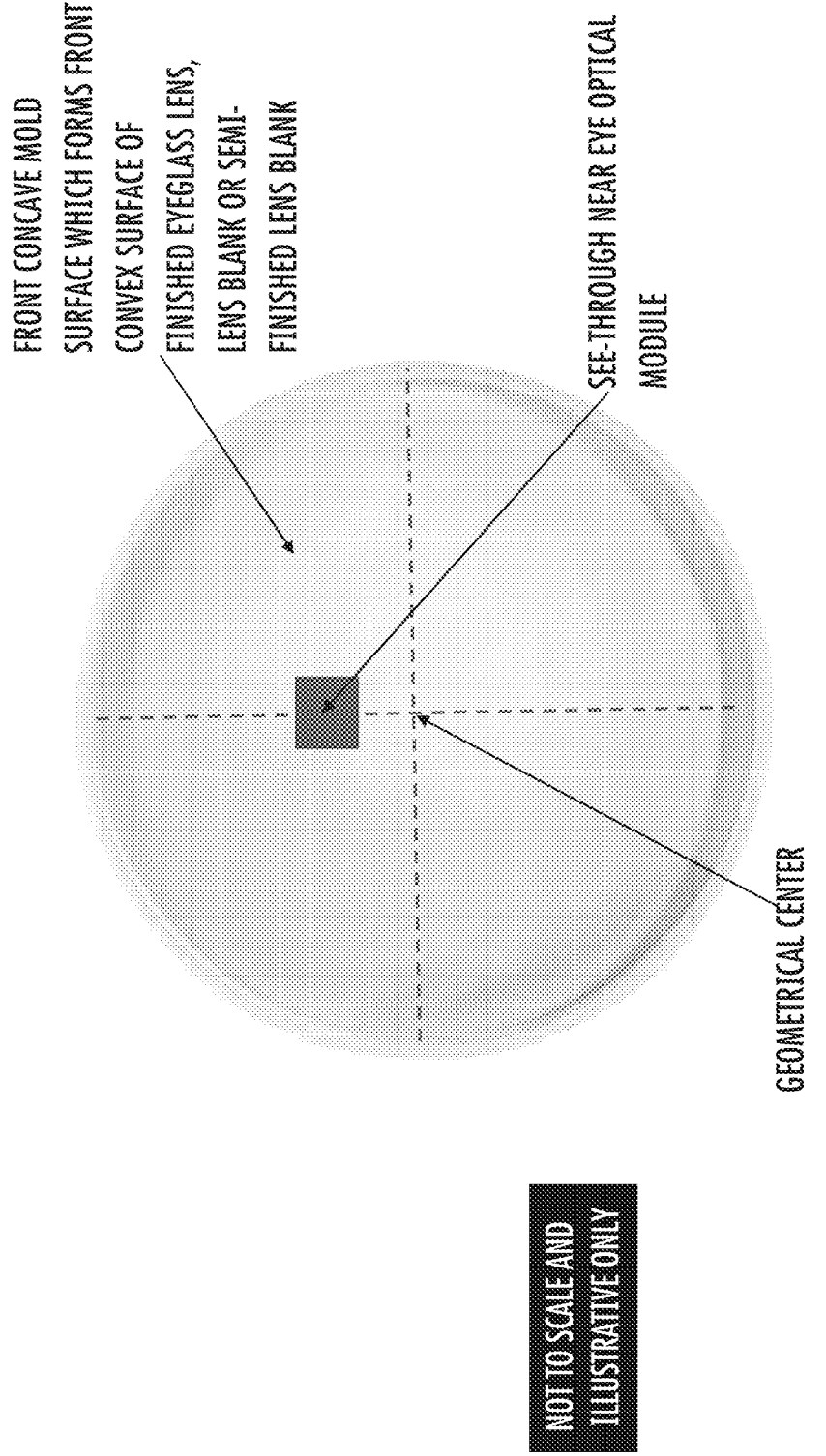
FIG. 6a is a schematic diagram of a depiction of one possible embodiment of the invention as disclosed herein.
Figure 6B:
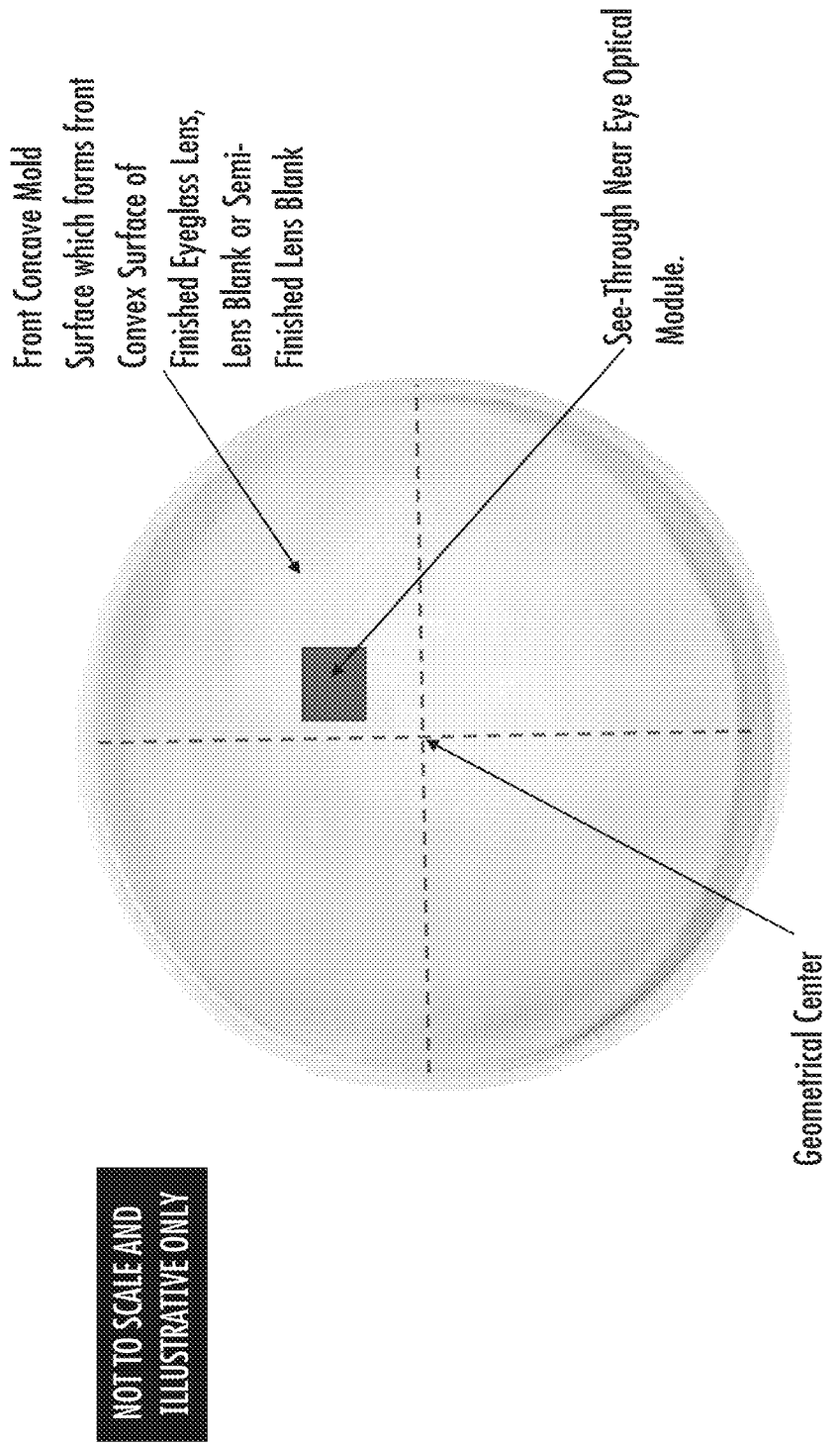
FIG. 6b is a schematic diagram of a depiction of one possible embodiment of the invention as disclosed herein.
Figure 6C:
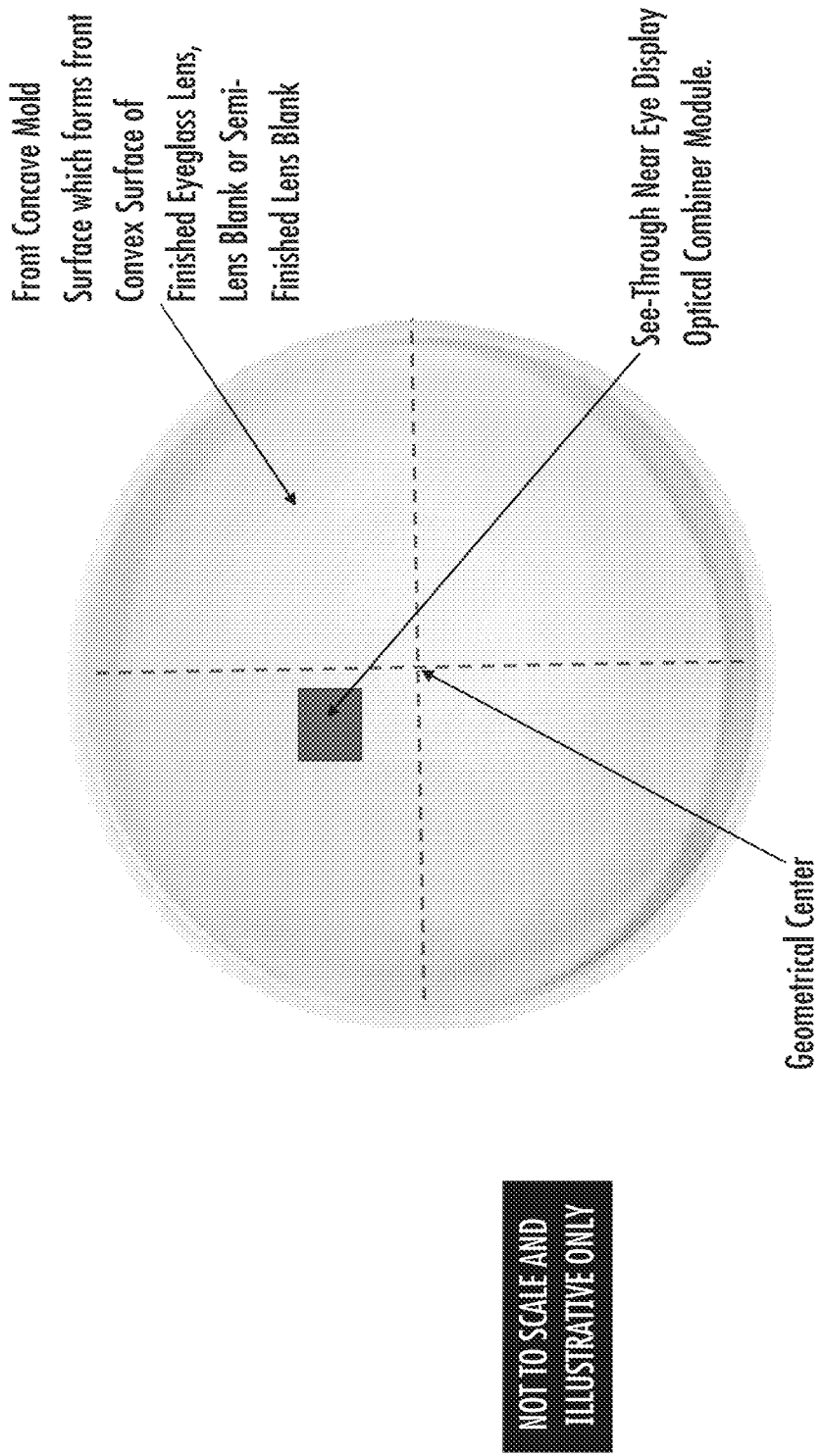
FIG. 6c is a schematic diagram of a depiction of one possible embodiment of the invention as disclosed herein.
Figure 6D:
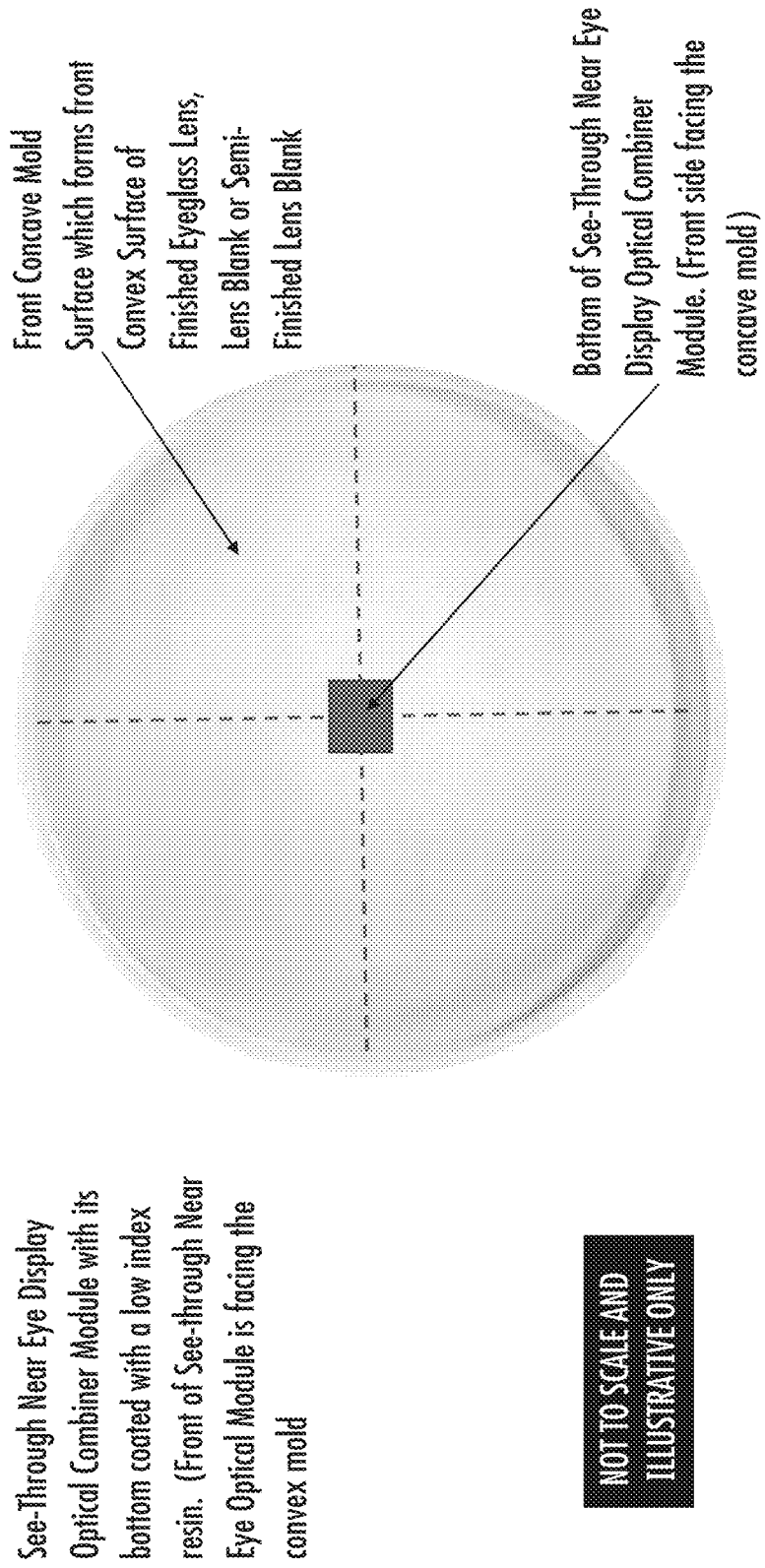
FIG. 6d is a schematic diagram of a depiction of one possible embodiment of the invention as disclosed herein.

With regards to embodiments in FIG. 5, the see-through near eye optical module can be housed at least partially within the eyewear lens section directly beneath the see-through near eye optical module and the eyewear lens provides the appropriate optical power to correct, if needed, the wearer's distance optical power needs. In aspects, a connecting, by way of example only, an electronic flex cable or flexible printed circuit attaches to an edge of the optical combiner and such a flex cable or flex circuit can be located, by way of example only, on the surface of the lens, in the surface of the lens, or under the surface of the lens. If located within a recessed portion of the lens, by way of example only, a single point diamond turning mill can fabricate this additional recess as an additional step before, during or after fabricating the recess of cavity in the lens surface that houses the see-through near eye optical module. In aspects, the flex cable or print circuit can connect to enabling electrical power that is provided through the eyewear that houses the eyewear lens. Such electrical power can be that of a rechargeable battery, or other power source that is located within the eyewear frame or connected to the eyewear frame.

In another embodiment (see, e.g., FIGS. 6a, 6b, 6c, 6d, 6e) whereby the see-through near eye optical module is fabricated within an ophthalmic lens, a thin layer of optical resin (in aspects, less than 0.5 mm thick) may be placed within a concave mold that forms the front convex surface of the eyewear lens. In certain cases, only the front surface of the see-through near eye optical module is coated to form a tacky surface and not the entire concave mold surface. Separately the see-through near eye optical module may be coated with a low index optical coating and such coating may be cured. The coating can be cured with one or more of heat or light, in aspects. The optical resin that was provided within the concave mold is first cured to make it tacky, in aspects. Following this, in aspects, the see-through near eye optical module (coated with a low index material) may be placed with its front closest to the concave mold surface in an appropriate location and positioned against the concave mold's surface (which ultimately will make the front convex surface of the eyewear lens). Given the tacky optical material of the front concave mold surface, the see-through near eye optical module once pressed against such tacky surface becomes attached thereto. Prior to positioning the see-through near eye optical module into place, the front side surface of the see-through near eye optical module can be coated with, by way of example only, a scratch resistant coating, UV coating, anti-reflection coating, or any combination thereof. The backside surface of the see-through near eye optical module can be, by way of example, coated with a blue light filter, a selective high energy blue light filter, a UV filter, or any combination thereof. Following attaching the see-through near eye optical module to the front concave mold surface, in aspects, a rear mold and gasket or tape is assembled to the front mold and additional optical resin is filled within the mold assembly and is cured. The curing can be, by way of example only, one or more of light cured, heat cured, or light and heat cured. The see-through near eye optical module is thus fixed and housed within the eyewear lens such that the see-through near eye optical module is positioned with the ophthalmic lens such that thickness and curvature of the back of the see-through near eye optical module provides the appropriate optical power for the eyewear lens such to allow for a wearer of the see-through near eye optical module to see the real world image clearly when looking through the see-through near eye optical module. Prior to positioning the see-through near eye optical module into place, the front side surface of the see-through near eye optical module can be coated with, by way of example only, a scratch resistant coating, UV coating, anti-reflection coating, or any combination thereof. The backside surface of the see-through near eye optical module can be, by way of example, coated with a blue light filter, a selective high energy blue light filter, a UV filter, or any combination thereof.

The mold assembly can make that of a semi-finished lens blank with the see-through near eye optical module located just below the front surface of the semi-finished lens blank. The mold assembly can make that of a semi-finished blank with the see-through near eye optical module located conformal with the front surface of the semi-finished lens blank. The mold assembly can make that of a finished lens blank with the see-through near eye optical module located just below the front surface of the finished lens blank. The mold assembly can make that of a finished lens blank with the see-through near eye optical module located conformal with the front surface of the finished lens blank.

In certain embodiments an electronic connector or cable can be attached to the see-through near eye optical module prior to positioning the see-through near eye optical module within the mold assembly, by way of example only, a flex cable can be positioned against the front surface of the mold. Such a flex cable can then be located and directed from the see-through near eye display to a peripheral edge of the front concave mold assembly that forms the front surface of the eyewear lens. In certain embodiments, an end of the electrical connector has male pins that connect to a female electrical connector located in or on the eyewear frame. In other embodiments, an end of the electrical connector has a female connection that connects to a male electrical connector located in or on the eyewear frame.

In another embodiment, the see-through near eye optical module is fabricated within an ophthalmic lens, and a layer of optical resin (in aspects, less than 0.5 mm thick) is placed within a concave mold that forms the front convex surface of the eyewear lens. Separately the see-through near eye optical module is coated with a low index optical coating and such coating is cured. The coating can be cured with one or more of heat or light or both. The optical resin that was provided within the concave mold is first cured to make it tacky. Following this the see-through near eye optical module (coated with a low index material) is placed with its front closest to the concave mold surface in an appropriate location and positioned against the concave mold's surface (which ultimately will make the front convex surface of the eyewear lens). Given the tacky optical material of the front concave mold surface, the see-through near eye optical module once pressed against such tacky surface becomes attached thereto. Following this the rear surface thickness and rear curvature (or lack thereof) is formed by way of 3D printing, in aspects, using an optical quality material. Prior to positioning the see-through near eye optical module into place, the front side surface of the see-through near eye optical module can be coated with, by way of example only, a scratch resistant coating, UV coating, anti-reflection coating, or any combination thereof. The backside surface of the see-through near eye optical module can be, by way of example, coated with a blue light filter, a selective high energy blue light filter, a UV filter, or any combination thereof.

The mold assembly can make that of a semi-finished lens blank with the see-through near eye optical module located just below the front surface of the semi-finished lens blank. The mold assembly can make that of a semi-finished blank with the see-through near eye optical module located conformal with the front surface of the semi-finished lens blank. The mold assembly can make that of a finished lens blank with the see-through near eye optical module located just below the front surface of the finished lens blank. The mold assembly can make that of a finished lens blank with the see-through near eye optical module located conformal with the front surface of the finished lens blank.

In certain embodiments an electronic connector or cable can be attached to the see-through near eye optical module prior to positioning the see-through near eye optical module within the mold assembly, by way of example only, a flex cable can be positioned against the front surface of the mold. Such a flex cable can then be located and directed from the see-through near eye display to a peripheral edge of the front concave mold assembly that forms the front surface of the eyewear lens. In certain embodiments, an end of the electrical connector has male pins that connect to a female electrical connector located in or on the eyewear frame. In other embodiments, an end of the electrical connector has a female connection that connects to a male electrical connector located in or on the eyewear frame.

Example Fabrication Steps of Embodiments

The steps of fabricating eyewear housing the see-through near eye display optical module(s) and eyewear lens(es).

Embodiment #1 a. Edge spectacle lens(es) to the eye rim(s) shape of the desired eyewear frame
b. Machine notch into the edged spectacle lens(es) accounting for the proper alignment of the wearer's interpupillary distance and positioning of the see-through near eye optical module relative to the wearer's eye(s) once mounted within the eyewear
c. Insert and pressure mount and/or adhesively bond the see-through near eye optical module(s) within notch of the edged spectacle lens(es)
d. Insert edged spectacle lens(es) having notch with the see-through near eye optical modules(s) into the appropriate eyewear rim
e. (steps c and d can be reversed and/or are interchangeable and the electrical connection to the see-through near eye optical module(s) can be accomplished at any point during the fabrication process)

The steps of fabricating eyewear housing see-through near eye optical module(s) and eyewear lens(es).

Embodiment #2 a. Edge spectacle lens(es) to the eye rim(s) shape of the desired eyewear frame
b. Machine hole into edged spectacle lens(es) accounting for the proper alignment of the wearer's interpupillary distance and positioning of the see-through near eye optical module(s) relative to the eye(s) of the wearer
c. Insert and pressure mount and/or adhesively bond the see-through near eye optical module(s) within hole of edged spectacle lens(es)
d. Insert edged spectacle lens(es) having hole with the see-through near eye optical modules(s) into the appropriate eyewear rim
e. (steps c and d can be reversed and/or are interchangeable and the electrical connection to the see-through near eye optical module(s) can be accomplished at any point during the fabrication process)

The steps of fabricating eyewear housing the see-through near eye display optical module(s) and eyewear lens(es).

Embodiments #3 a. Edge spectacle lens(es) to the eye rim(s) shape of the desired eyewear frame
b. Machine groove into the edged spectacle lens(es) accounting for the proper alignment of the wearer's interpupillary distance and positioning of the see-through near eye optical module relative to the wearer's eye(s) once mounted within the eyewear
c. Insert and pressure mount and/or adhesively bond the see-through near eye optical module(s) within groove of the edged spectacle lens(es)
d. Insert edged spectacle lens(es) having groove with the see-through near eye optical modules(s) into the appropriate eyewear rim
e. (steps c and d can be reversed and/or are interchangeable and the electrical connection to the see-through near eye optical module(s) can be accomplished at any point during the fabrication process)

The steps of fabricating eyewear housing see-through near eye optical module(s) and eyewear lens(es).

Embodiment #4 a. Edge or shape the outer peripheral area of the see-through near eye optical combiner(s) for fitting in the upper section(s) of the desired eyewear frame front's eyewear rim(s)
b. Mount the shaped see-through near eye display optical module(s) having the appropriate distance optical correction and interpupillary distance for the wearer within the upper section of the eyewear frame front rim(s)

c. Edge the spectacle lens(es) and mount in the lower section of the eyewear frame front rim(s)
d. Bond the lower edge of the upper section(s) to the upper edge of the lower section(s) "or" mount the upper section within the upper eyewear rim and the lower section within the lower eyewear rim (whereby there can be an optional strap or other connection in between).
e. (the electrical connection to the see-through near eye optical module(s) can be accomplished at any point during the fabrication process)

The steps of fabricating eyewear housing see-through near eye optical module(s) within eyewear lens(es).

Embodiment #5 a. Edge the eyewear lens for the shape of the eyewear frame
b. Locate where a recess or cavity should be formed within the front surface of the eyewear lens relative to the wearer/user's pupils. In most, but not all cases, the location would be at or above the upper edge of the wearer/user's eye pupil. It/they would also be further aligned based upon the wearer/user's inter-pupillary distance.
c. Fabricate the recess or cavity using, by way of example only, a single point diamond turning mill. Such a recess or cavity can be formed within the front surface of the eyewear lens having the desired finished/polished curvature of the bottom inside surface of the recess or cavity.
d. Maintain a thickness between the bottom of the inside side surface of the recess or cavity and the back surface curvature of the eyewear lens of, in aspects, 0.25 mm of lens thickness or greater. Such a recess or cavity should have a bottom inside surface curvature that permits the distance power of the eyewear lens as measured at that point to be of the same optical power as that of the peripheral surrounding distance optical power of the eyewear lens. Said another way the overall optical power measured through the see-through near eye optical module and the eyewear lens thickness directly beneath the see-through near eye optical module should be within 10% of the optical power measured in the same location of the eyewear lens prior to the recess or cavity being fabricated. In a preferred case such optical power would be equal to that of the optical power of the eyewear lens prior to the recess or cavity being fabricated.
e. Optionally fabricate micro-holes within the bottom of the cavity and through the back surface of the lens thickness behind the cavity or a certain thickness thereof.
f. Mount the see-through near eye optical combiner within the recess or cavity while maintaining a gap (for, for example, air, gas, material spacer or a low index adhesive) under the bottom of the see-through near eye optical module and the bottom curvature of the inside surface of the recess or cavity. The mounting can be done, by way of example only, with the use of a low index adhesive or a pressure mount in addition to the low index adhesive. Keep the placement of the front surface of the optical combiner conformal to that of the front surface of the eyewear lens.
g. Optionally provide an anti-reflection coating and/or hard scratch resistant coating over the front surface of the near eye display and the adjacent front surface of the eyewear lens such to provide a conformal curve.
h. Optionally provide a surface cast resin layer over the front surface of the near eye display and the adjacent front surface of the eyewear lens such to provide a conformal curve.
i. (The electrical connection to the see-through near eye optical module(s) can be accomplished at any point during the fabrication process)
j. Optionally fabricate a groove or recess in the front surface of the edged eyewear lens from a peripheral portion of the edge lens to the see-through near eye optical module for an electrical connector (by way of example only) a flex cable for providing electrical power to the see-through near eye optical module to fit within.

The steps of fabricating eyewear housing see-through near eye optical module(s) within eyewear lens(es).

Embodiment #6 a. Coat see-through near eye optical module with a low index coating and cure
b. Select front concave curve mold of the appropriate curvature that will make the front surface curvature of the eyewear lens
c. Fill with a layer (in aspects, less than 0.50 mm) of optical quality resin (such resins are known in the art)
d. Cure resin layer to a tacky state
e. Appropriately position and attach see-through near eye optical module front down adjacent to the concave mold
f. Apply gasket or tape and back mold (that forms the rear surface of a finished lens or semi-finished lens blank)
g. Fill mold assembly with desired optical quality resin and cure
h. Demold mold assembly
i. Optionally add optical coating on front and or back surface of finished lens or semi-finished lens blank
j. Edge and/or surface lens blank locating the see-through near eye display in the appropriate location relative to the eye(s) of the wearer
k. Optionally attach electrical connection of the see-through near eye optical module to the appropriate connection of the eyewear or vice versa The steps of fabricating eyewear housing see-through near eye optical module(s) within eyewear lens(es).

Embodiment #7 a. Coat see-through near eye optical module with a low index coating and cure
b. Select front concave curve mold of the appropriate curvature that will make the front surface curvature of the eyewear lens
c. Fill with a layer (in aspects, less than 0.50 mm) of optical quality resin (such resins are known in the art)
d. Cure resin layer to a tacky state
e. Appropriately position and attach see-through near eye optical module front down adjacent to the concave mold
f. Utilizing, in aspects, 3D printing to print the remainder of the finished lens or semi-finished lens blank around and/or over the see-through near eye optical module
g. Demold front mold
h. Optionally add optical coating on front and/or back surface of finished lens or semi-finished lens blank
i. Edge and/or surface lens blank locating the see-through near eye display in the appropriate location relative to the eye(s) of the wearer
j. Optionally attach electrical connection of the see-through near eye optical module to the appropriate connection of the eyewear or vice versa.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Any of the methods disclosed herein can be used with any of the compositions disclosed herein or with any other compositions. Likewise, any of the disclosed compositions can be used with any of the methods disclosed herein or with any other methods. Other embodiments of the invention will be apparent to those skilled in the art from consideration of the specification and practice of the invention.

It is noted in particular that where a range of values is provided in this specification, each value between the upper and lower limits of that range, to the tenth of the unit disclosed, is also specifically disclosed. Any smaller range within the ranges disclosed or that can be derived from other endpoints disclosed are also specifically disclosed themselves. The upper and lower limits of disclosed ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. An Augmented Reality or Mixed Reality system comprising an ophthalmic lens in optical communication with a see-through near eye optical module, wherein the see-through near eye optical module comprises a see-through near eye display and a micro-lens array, wherein a portion of a back side of the see-through near eye optical module is in front of a portion of the ophthalmic lens, wherein a floor or bottom portion of the ophthalmic lens that is closest to the back side of the see-through near eye optical module is curved or shaped within 20% of a base curve of a front surface of the ophthalmic lens to which the see-through near eye optical module has been positioned or has replaced, and wherein a surface area of the back side of the see-through near eye optical module is smaller compared to a surface area of a back side of the ophthalmic lens.

2. The Augmented Reality or Mixed Reality system of claim 1, wherein a portion of the see-through near eye optical module is embedded within or attached to the ophthalmic lens.

3. The Augmented Reality or Mixed Reality system of claim 1, wherein a portion of the see-through near eye optical module is attached to the front surface of the ophthalmic lens.

4. The Augmented Reality or Mixed Reality system of claim 1, wherein a portion of the see-through near eye optical module is located within a front portion of the ophthalmic lens.

5. The Augmented Reality or Mixed Reality system of claim 1, wherein the ophthalmic lens has optical power.

6. The Augmented Reality or Mixed Reality system of claim 1, wherein the ophthalmic lens is devoid of optical power.

7. The Augmented Reality or Mixed Reality system of claim 1, wherein the see-through near eye optical module is curved within 10% of the base curve of the front surface of the ophthalmic lens.

8. The Augmented Reality or Mixed Reality system of claim 1, wherein an area of the ophthalmic lens located behind the see-through near eye optical module embedded within the ophthalmic lens comprises a groove or recess.

9. The Augmented Reality or Mixed Reality system according to claim 1, wherein a measured optical power of the see-through near eye optical module includes no optical power or includes optical power.

10. The Augmented Reality or Mixed Reality system according to claim 1, wherein the see-through near eye optical module further comprises a blue light filter.

11. The Augmented Reality or Mixed Reality system of claim 1, wherein the see-through near eye optical module is completely, hermetically, or partially sealed.

12. The Augmented Reality or Mixed Reality system of claim 1, wherein the ophthalmic lens comprises a recess or groove, wherein a bottom of the recess or groove comprises a low index material, and wherein the see-through near eye optical module is positioned in the recess or groove.

13. An Augmented Reality or Mixed Reality system comprising an ophthalmic lens in optical communication with a see-through near eye optical module, wherein the see-through near eye optical module comprises a see-through near eye display and a see-through near eye micro-lens array, wherein an overall optical power measured through the see-through near eye optical module and the ophthalmic lens which is located behind the see-through near eye optical module is within 10% of a same optical power as a distance portion of the ophthalmic lens.

14. The Augmented Reality or Mixed Reality system of claim 13, wherein all or a portion of the see-through near eye optical module is embedded within or attached to the ophthalmic lens.

15. The Augmented Reality or Mixed Reality system of claim 13, wherein all or a portion of the see-through near eye optical module is attached to a front surface of the ophthalmic lens.

16. The Augmented Reality or Mixed Reality system of claim 13, wherein all or a portion of the see-through near eye optical module is located in front of the ophthalmic lens.

17. The Augmented Reality or Mixed Reality system of claim 13, wherein the ophthalmic lens has optical power.

18. The Augmented Reality or Mixed Reality system of claim 13, wherein the ophthalmic lens is devoid of optical power.

19. The Augmented Reality or Mixed Reality system of claim 13, wherein the ophthalmic lens has a base curve of a front surface.

20. The Augmented Reality or Mixed Reality system of claim 13, wherein the see-through near eye optical module is curved within 10% of a base curve of a front surface of the ophthalmic lens.

21. An Augmented Reality or Mixed Reality system comprising an ophthalmic lens in optical communication with a see-through near eye optical module, wherein the see-through near eye optical module comprises a see-through near eye display and a see-through near eye micro-lens array, wherein an optical power measured through the see-through near eye optical module and the ophthalmic lens which is located behind the see-through near eye optical module is within 20% of a same optical power as measured through the ophthalmic lens prior to any modification of the ophthalmic lens for attaching the see-through near eye optical module.

22. The Augmented Reality or Mixed Reality system of claim 21, wherein a portion of the see-through near eye optical module is embedded within or attached to the ophthalmic lens.

23. The Augmented Reality or Mixed Reality system of claim 21, wherein a portion of the see-through near eye optical module is attached to a front surface of the ophthalmic lens.

24. The Augmented Reality or Mixed Reality system of claim 21, wherein a portion of the see-through near eye optical module is located in front of the ophthalmic lens.

25. The Augmented Reality or Mixed Reality system of claim 21, wherein the ophthalmic lens has optical power.

26. The Augmented Reality or Mixed Reality system of claim 21, wherein the ophthalmic lens is devoid of optical power.

27. The Augmented Reality or Mixed Reality system of claim 21, wherein the ophthalmic lens has a base curve of a front surface.

28. The Augmented Reality or Mixed Reality system of claim 21, wherein the see-through near eye optical module is curved within 10% of a base curve of a front surface of the ophthalmic lens.

29. The Augmented Reality or Mixed Reality system of claim 21, wherein an area of the ophthalmic lens located behind the see-through near eye optical module embedded within the ophthalmic lens comprises a groove or recess.

* * * * *